(12) United States Patent
Subramani

(10) Patent No.: US 9,806,799 B2
(45) Date of Patent: Oct. 31, 2017

(54) METHODS AND APPARATUS FOR A TDMA MESH NETWORK

(71) Applicant: KABUSHIKI KAISHA TOSHIBA, Tokyo (JP)

(72) Inventor: Siva Kupanna Subramani, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 15/022,446

(22) PCT Filed: Sep. 17, 2013

(86) PCT No.: PCT/GB2013/052429
§ 371 (c)(1),
(2) Date: Mar. 16, 2016

(87) PCT Pub. No.: WO2015/040349
PCT Pub. Date: Mar. 26, 2015

(65) Prior Publication Data
US 2016/0226575 A1    Aug. 4, 2016

(51) Int. Cl.
*H04B 7/26* (2006.01)
*H04W 72/12* (2009.01)
*H04W 84/18* (2009.01)

(52) U.S. Cl.
CPC ...... *H04B 7/2643* (2013.01); *H04W 72/1226* (2013.01); *H04W 72/1231* (2013.01); *H04W 84/18* (2013.01)

(58) Field of Classification Search
CPC ......... H04W 72/1226; H04W 72/1231; H04W 84/18; H04B 7/2643
See application file for complete search history.

(56) References Cited

U.S. PATENT DOCUMENTS

2003/0214914 A1* 11/2003 Cain ............... H04B 7/0491
 370/252
2006/0268791 A1* 11/2006 Cheng ............ H04W 72/1278
 370/338

(Continued)

FOREIGN PATENT DOCUMENTS

| EP | 2 597 911 | 5/2013 |
|---|---|---|
| WO | WO 2007/070783 | 6/2007 |
| WO | WO 2012/042432 | 4/2012 |

OTHER PUBLICATIONS

International Search Report from the European Patent Office for International Application No. PCT/GB2013/052429, dated Jun. 3, 2014.

(Continued)

Primary Examiner — Jianye Wu
(74) *Attorney, Agent, or Firm* — Finnegan, Henderson, Farabow, Garrett & Dunner, L.L.P.

(57) ABSTRACT

A concentrator is configured to reschedule a TDMA mesh network in response to an interrupted transmission. The new schedule is calculated by selectively rescheduling transmissions that are scheduled in the same time slot as the interrupted transmission. Transmissions are selected to be rescheduled based on the proximity of the sector of the transmission to the sector of the interrupted transmission. The sectors of the mesh network are defined by neck nodes, where a neck node is a node that can communicate directly with the concentrator.

20 Claims, 19 Drawing Sheets

(56) References Cited

U.S. PATENT DOCUMENTS

2008/0305772 A1* 12/2008 Balasubramanian ... H04L 63/08
455/411
2009/0310592 A1   12/2009 Kessleman et al.
2012/0039271 A1    2/2012 Kim et al.
2014/0106686 A1*  4/2014 Higgins .................. H04B 1/40
455/78

OTHER PUBLICATIONS

Brar et al.; "Computationally Efficient Scheduling With the Physical Interference Model for Throughput Improvement in Wireless Mesh Networks" Proceedings of the ACM Mobicom, 12 pages, (2006).
Moscibroda et al.; "The Complexity of Connectivity in Wireless Networks", Proceedings of the $25^{th}$ Conference of the IEEE INFOCOM, 13 pages, (2006).
Yuan et al.; "Interference Minimization Routing and Scheduling in Cognitive Radio Wireless Mesh Networks", Proceedings of the IEEE WCNC, 6 pages, (2010).
Salem et al.; "A Fair Scheduling for Wireless Mesh Networks", WIMesh, USA, 8 pages, (2005).

* cited by examiner

| i | i + 1 | i + 2 | i + 3 | i + 4 | i + 5 |
|---|---|---|---|---|---|
| 2 → 0<br>22 → 21 | 1 → 0<br>14 → 13 | 13 → 3<br>9 → 8<br>23 → 22 | 3 → 0<br>12 → 11 | 8 → 1<br>16 → 15 | 7 → 0<br>19 → 6<br>15 → 4 |

METHODS AND APPARATUS FOR A TDMA MESH NETWORK

FIELD

Embodiments described herein relate generally to methods and systems for rescheduling a TDMA mesh network.

BACKGROUND

In a mesh network, nodes can act as relays for other nodes, as well as transmitting their own data. For example, a node, the source node, may seek to communicate data to another node, the destination node, but the source node may be separated from the destination node by a distance which limits or prevents successful direct communication between the nodes. In a mesh network, the source node can transmit the data to an intermediate node which can then transmit the data to the destination node. In this case, the data is transmitted in two hops from the source node to the destination node. For large networks, data may be transmitted in a number of hops to reach the destination node. This is known as multi-hop communication. The concept of mesh networking can be applied to both wireless and wired networks.

Wireless mesh networking (WMN) enables interconnection of a large number of wireless devices in a locality. Interconnection of smart metering devices in an advanced metering infrastructure (AMI) is an example of WMN. WMN allows multi-hop communications between nodes, and the mesh topology provides a robust and extendable network to reach an access point or router. Wireless mesh networks are already deployed and operational for various applications, for example advanced metering infrastructure (AMI) networks. Other applications could include mesh networks in Smart Cities, content-centric distribution networks and WiFi/sensor networks.

BRIEF DESCRIPTION OF THE DRAWINGS

In the following, embodiments will be described with reference to the accompanying drawings in which.

DETAILED DESCRIPTION

Figure 1:
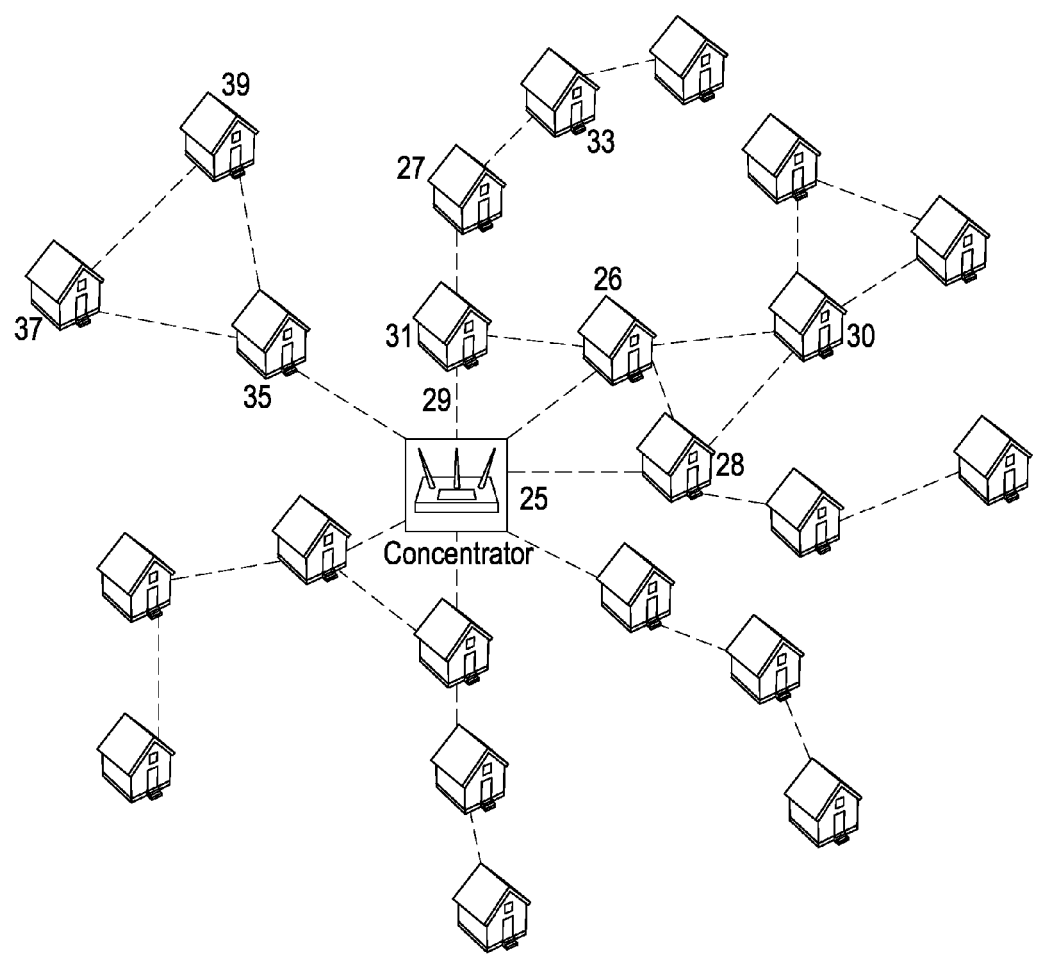
FIG. 1 shows the interconnection of a smart metering mesh network in a locality.

According to an embodiment, there is provided a concentrator configured to send signals to and receive signals from a plurality of neck nodes in a TDMA mesh network, wherein each neck node defines a sector of the mesh network which may comprise a plurality of further nodes, the concentrator comprising: a detecting unit, configured to detect for interruption of transmission between a first node and a second node scheduled in a first time slot; a sector establishing module, configured to establish the sector of an interrupted transmission by identifying the neck node through which at least one of said first node and said second node is scheduled to communicate with the concentrator; a determining module, configured to identify a sector to be checked and to determine whether any nodes in said sector are scheduled to transmit during said first time slot, wherein each sector is successively identified to be checked according to its proximity to the sector of the interrupted transmission, until at least one node scheduled to transmit during said first time slot is found; a scheduling module, configured to determine a different time slot for the transmission from said at least one node found by the determining module; a sending unit, configured to send a signal instructing rescheduling of said transmission to said different time slot.

The concentrator may comprise a performance checking module configured to: determine the SINR for the interrupted transmission without the contribution from transmissions from nodes found by the determining module and check whether SINR is greater than or equal to a threshold value, where if the SINR is not greater than or equal to a threshold value, it outputs information to said determining module indicating that the next sector is to be identified to be checked. If the SINR is greater than or equal to a threshold value, the performance checking module may be configured to output to the scheduling module. The threshold value may be equal to −85 dBm. The threshold value may be equal to any value in the range of −70 dBm to −85 dBm. The performance checking module may be configured to determine the SINR by calculating the SINR value. Alternatively, the SINR may be the actual received power at the receiver of the interrupted link. The concentrator may be configured to iterate the process of identifying a sector to be checked, determining the SINR of the interrupted transmission without the contribution from transmissions from nodes found by the determining module and checking whether SINR is greater than or equal to a threshold value, where if the SINR is not greater than or equal to a threshold value, it outputs information to said determining module indicating that the next sector is to be identified to be checked, until the SINR is greater than or equal to the threshold value.

The scheduling unit may be configured to calculate a different time slot by adding a new time slot to the schedule. Calculating a different time slot may comprise determining the SINR of the transmission from nodes found by the determining module, for each time slot of the schedule and determining the set of time slots for which the SINR is greater than or equal to the threshold value; and selecting the time slot from this set with the largest SINR. Determining the SINR may comprise calculating the SINR value. Alternatively, the SINR may be the actual received power at the receiver of the link.

The detecting unit may be configured to register an interruption of a transmission if it is detected that data from said first node has not been received for four successive periods. It may further be configured to register an interruption of a transmission if it is also detected that no power outage alert message has been received for said first node or said second node. The detecting unit may be configured to register an interruption of a transmission if a signal is detected containing information indicating that the received power for the transmission on the link is below a certain threshold value.

The determining module may be further configured to identify the first sector to be checked as the sector of the interrupted transmission. It may be configured to identify the next sector to be checked by identifying a sector that has not been checked, and that is adjacent to a sector that has been checked. A sector that is adjacent to a sector that has been checked may be identified using information stored at the concentrator indicating the neck-node_ID of each neck node.

The sector establishing module and the determining module may use information indicating the topology of the mesh network to establish the sector of interrupted transmission and to identify a sector to be checked.

In one embodiment, the concentrator further comprises a rank establishing module, wherein the determining module is further configured to output information to said rank establishing module if a plurality of nodes scheduled to transmit during said first time slot are found in said sector identified to be checked; where said rank establishing module is configured to: establish the rank of each of the plurality of nodes scheduled to transmit during said first time slot found in said sector identified to be checked, where the rank is a value indicating the number of nodes through which a node communicates with the concentrator; determine the differences between the rank of each of said nodes and the rank of said second node; and identify the node for which the difference is the smallest value.

The rank establishing module may be further configured to output information to said performance checking module indicating the node for which the difference is the smallest value.

In one embodiment, the concentrator further comprises a re-routing module, configured to determine the SINR for a transmission from said first node to each possible receiver node, for each time slot in the schedule. The re-routing module may be configured to determine the SINR by calculating the SINR value. Alternatively, the SINR may be the actual received power at the receiver of the link. The rerouting module may be further configured to identify the set of nodes for which SINR is greater than or equal to a threshold value and select the node from said set of nodes for which the number of hops to said concentrator is least.

The concentrator may be a concentrator for a wireless smart meter mesh network.

According to an embodiment, there is provided a TDMA mesh network, comprising a concentrator, further comprising a plurality of neck nodes, wherein each neck node is configured to communicate directly with said concentrator and defines a sector of the mesh network, which may comprise a plurality of further nodes, wherein said concentrator is configured to send signals to and receive signals from the plurality of neck nodes, wherein each neck node defines a sector of the mesh network which may comprise a plurality of further nodes, the concentrator comprising: a detecting unit, configured to detect for interruption of transmission between a first node and a second node scheduled in a first time slot; a sector establishing module, configured to establish the sector of an interrupted transmission by identifying the neck node through which at least one of said first node and said second node is scheduled to communicate with the concentrator; a determining module, configured to identify a sector to be checked and to determine whether any nodes in said sector are scheduled to transmit during said first time slot, wherein each sector is successively identified to be checked according to its proximity to the sector of the interrupted transmission, until at least one node scheduled to transmit during said first time slot is found; a scheduling module, configured to determine a different time slot for the transmission from said at least one node found by the determining module; a sending unit, configured to send a signal instructing rescheduling of said transmission to said different time slot.

According to an embodiment, there is provided a method of managing communication in a TDMA mesh network, wherein said mesh network comprises a concentrator and a plurality of neck nodes, wherein each neck node is configured to communicate directly with said concentrator and defines a sector of the mesh network which may comprise a plurality of further nodes, the method comprising: detecting for interruption of transmission between a first node and a second node scheduled in a first time slot; in the event that an interruption is detected: establishing the sector of the interrupted transmission by identifying the neck node through which at least one of said first node and said second node is configured to communicate with said concentrator; identifying a sector to be checked and determining whether any nodes in said sector are scheduled to transmit during said first time slot, wherein each sector is successively identified to be checked according to its proximity to the sector of the interrupted transmission, until at least one node scheduled to transmit during said first time slot is found; rescheduling the transmission from said at least one node to a different time slot.

The method may be performed at the concentrator.

The method may further comprise the steps of determining the SINR for the interrupted transmission, without the contribution from nodes scheduled to transmit during said first time slot found in the sectors checked; checking whether said SINR is greater than or equal to a threshold value; if SINR is not greater than or equal to a threshold value, identifying the next sector to be checked; and if said SINR is greater than or equal to a threshold value, rescheduling the transmissions from said nodes to different time slots.

The threshold value may be equal to −85 dBm. The threshold value may be equal to any value in the range of −70 dBm to −85 dBm. Determining the SINR may include calculating the SINR value. Alternatively, the SINR may be the actual received power at the receiver of the interrupted link. The steps of identifying a sector to be checked, determining the SINR of the interrupted transmission without the contribution from transmissions from nodes found by the determining module and checking whether SINR is greater than or equal to a threshold value, where if the SINR is not greater than or equal to a threshold value, the next sector is to be identified to be checked, may be iterated until the SINR is greater than or equal to the threshold value.

Rescheduling the transmission may comprise the step of calculating a different time slot by adding a new time slot to the schedule. Rescheduling the transmission may comprise the step of calculating a different time slot by: determining the SINR of the transmission from nodes scheduled to transmit during said first time slot found in the sectors checked for each time slot in the schedule; identifying any time slots for which SINR is greater than or equal to the communication threshold; if there are such time slots, selecting the time slot for which the SINR has the largest value; if there are no such time slots, adding a new time slot to the schedule. Rescheduling the transmission may comprise the step of sending a control signal from the concentrator to the nodes in the network. Determining the SINR may comprise calculating the SINR value. Alternatively, the SINR may be the actual received power at the receiver of the link.

Detecting for an interruption of a transmission may comprise detecting that data from a first node has not been received for four successive periods. Detecting for an interruption of a transmission may comprise detecting that no power outage alert message for said node has been received. Detecting for interruption of a transmission may comprise detecting for a signal containing information indicating that the received power for the transmission on the link is below a certain threshold value.

Establishing the sector of the interrupted transmission may comprise the step of establishing the transmitter and receiver node for the interrupted link. This comprises identifying the nodes from which data has not been received, and from information indicating the network topology, determining which of these nodes is the node from which transmission has been interrupted. The method may also comprise the step of establishing the time slot in which the interrupted transmission is scheduled from stored information indicating the time slot schedule.

Identifying the sector to be checked may comprise the step of identifying the sector of interrupted transmission as the first sector to be checked. Identifying the next sector to be checked may comprise the step of identifying a sector that has not been checked, and that is adjacent to a sector that has been checked. Identifying a sector to be checked comprises the step of identifying the sector that is adjacent to a sector that has been checked using information stored at the concentrator indicating the neck-node_ID of each neck node.

In one embodiment, where a plurality of nodes scheduled to transmit during said first time slot are found in said sector identified to be checked, the method further comprises the step of: establishing the rank of each of said plurality of nodes scheduled to transmit during said first time slot found in said sector identified to be checked, wherein the rank is a value indicating the number of nodes through which a node communicates with the concentrator; determining the differences between the rank of each of said nodes and the rank of said second node; identifying the node for which the difference is the smallest value.

The method may further comprise the steps of calculating the SINR for the interrupted transmission, without the contribution from nodes scheduled to transmit during said first time slot found in the sectors checked; checking whether said SINR is greater than or equal to a threshold value; if said SINR is greater than or equal to a threshold value, rescheduling the transmissions from said nodes to different time slots; if SINR is not greater than or equal to a threshold value, identifying the node for which the rank difference is the next smallest value.

In an embodiment, the method comprises determining the SINR for a transmission from said first node to each possible receiver node in the network, for each time slot in the schedule. Determining the SINR may involve calculating the SINR value. Alternatively, the SINR may be the actual received power at the receiver of the link. In a further embodiment, the method includes identifying the set of nodes for which SINR is greater than or equal to a threshold value and selecting the node from said set of nodes for which the number of hops to said concentrator is least.

According to an embodiment, there is provided a non-transitory computer program product stored on a computer-readable media comprising instructions operative to cause a processor to execute a method of managing communication in a TDMA mesh network, wherein said mesh network comprises a concentrator and a plurality of neck nodes, wherein each neck node is configured to communicate directly with said concentrator and defines a sector of the mesh network which may comprise a plurality of further nodes, the method comprising: detecting for interruption of transmission between a first node and a second node scheduled in a first time slot; in the event that an interruption is detected: establishing the sector of the interrupted transmission by identifying the neck node through which at least one of said first node and said second node is configured to communicate with said concentrator; identifying a sector to be checked and determining whether any nodes in said sector are scheduled to transmit during said first time slot, wherein each sector is successively identified to be checked according to its proximity to the sector of the interrupted transmission, until at least one node scheduled to transmit during said first time slot is found; rescheduling the transmission from said at least one node to a different time slot.

A concentrator is configured to reschedule a TDMA mesh network in response to an interrupted transmission. The new schedule is calculated by selectively rescheduling transmissions that are scheduled in the same time slot as the interrupted transmission. Transmissions are selected to be rescheduled based on the proximity of the sector of the transmission to the sector of the interrupted transmission. The sectors of the mesh network are defined by neck nodes, where a neck node is a node that can communicate directly with the concentrator.

FIG. 1 shows a smart metering mesh network 10 comprising a plurality of meters (27 to 39) interconnected by wired connections (indicated by broken lines). A concentrator 25 provides a gateway to other networking services, such as the internet or cloud based services (not shown). Several of the meters (26, 28, 31, 35) are shown having direct communications pathways to the concentrator 25. These meters are known as "neck nodes" throughout this description. Others of the meters rely on relaying, including via one of the neck nodes, to communicate with the concentrator 25.

Either by direct communication, or by multi-hop communication, the concentrator 25 is operable to receive data from any of the meters. For example, neck node 31 is connected to the concentrator 25 by the communication route indicated by line 29.

In the case of a wired network, directly connected can mean a cable or fibre optic that connects the neck node 31 and the concentrator 25. In the case of a wireless network, directly connected can mean that the neck node 31 is configured to transmit a signal that contains information identifying the concentrator 25 as the receiver. The concentrator is configured to receive and process all signals that identify the concentrator as the receiver. Directly connected can mean simply that the concentrator is within transmission range of the node and that the concentrator and node are capable of communicating with each other.

If not directly connected to the concentrator 25, the meters use multi-hop communication through the mesh network. Some meters will be directly connected to a neck node. This is the case for meter 27. Meter 27 is two hops away from the concentrator 25 and is connected to the concentrator via neck node 31. Other meters will be many hops away from the concentrator. For example, meter 33 communicates with the concentrator via meter 27 and meter 31. Meters 27 and 31 act as relay nodes for meter 33. Meter 27 receives the data from meter 33, and transmits it to meter 31. Meter 31 receives the data and transmits it to the concentrator 25. At a given instant, the mesh network could be reduced to a set of nodes forming a tree structure and connected to the mesh router or concentrator 25 via a neck node.

All the nodes that communicate with a concentrator through a single neck node form a sector of the network. For example meters 27 and 33 communicate with the concentrator 25 through neck node 31. Therefore meters 27, 33 and 31 are in the same sector, and this sector is identified with neck node 31. Meters 35, 37 and 39 are in the same sector, and this sector is identified with meter 35. This sector is adjacent to the sector identified with meter 31. Network topology information may be stored at the concentrator which designates which sectors are adjacent to each other. Each node is identified in the network topology information by a node_ID number. Further information regarding the position and communication routes between the nodes can be stored. Sectors are adjacent when there are no nodes from a different sector between the sectors in question. Which sectors are adjacent can be determined by the proximity of the neck nodes, that is the spatial distance between them. Information about the spatial distance between the nodes can be stored at the concentrator. Each neck node has a neck-node_ID that designates its position in the network relative to the other neck nodes. The neck-node_ID of neck nodes of adjacent sectors may be consecutive numbers. The neck node with neck-node_ID N1 may identify the adjacent sector to the sector of the neck node with neck-node_ID N2 for example.

Figure 2:
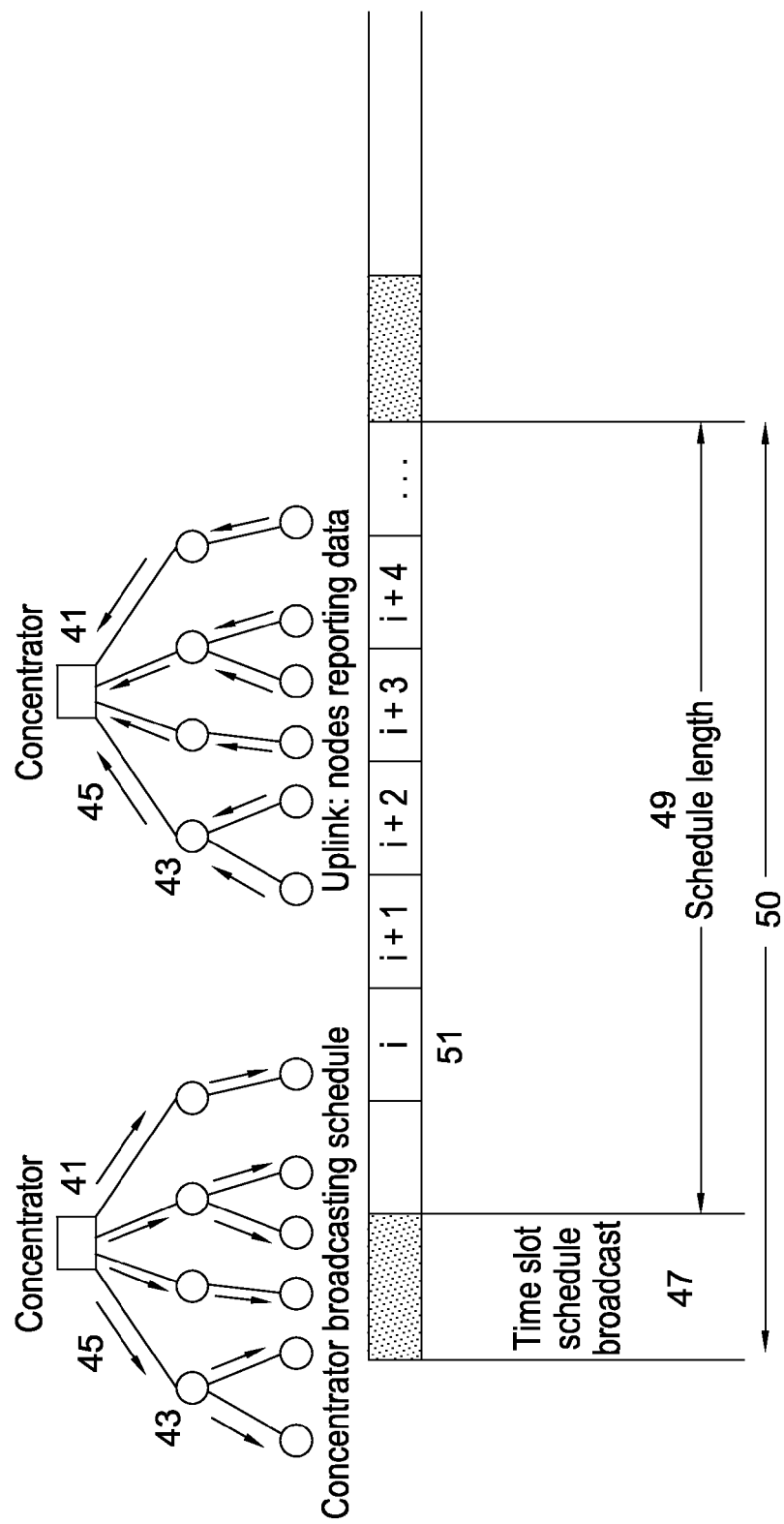
FIG. 2 shows the time slot schedule broadcast and data traffic for a TDMA network.

FIG. 2 shows the time slot schedule broadcast and data traffic for a TDMA network. The figure shows two diagrams of the same mesh network, with a concentrator 41 and several nodes in a mesh network. The first diagram shows the concentrator broadcasting the schedule to the nodes. The transmission of the schedule through the network is indicated by arrows along the links, in the direction outward from the concentrator. For example, arrow 45 shows the broadcast of the schedule from the concentrator 41 to the neck node 43. The schedule is then transmitted from node 43 to the nodes connected to node 43. The second diagram shows data sent from the nodes to the concentrator.

Each smart meter will periodically report its meter reading to its concentrator. This may involve the data being received and transmitted by several other nodes in a multi-hop communication. For a large network, this results in a large number of transmissions for each period. There is therefore required to be some mechanism to avoid collisions of transmissions. Carrier sense multiple access (CSMA) type medium access control (MAC) can be used for wireless mesh networks. However, CSMA MAC may not be spectrally efficient, due to its conservative carrier sensing and collision avoidance accessing techniques. In CSMA MAC the throughput that nodes enjoy can fluctuate dramatically depending on the distribution in WMN. Also, nodes that are two or more hops away from the access points may not get a fair share of transmission time.

In Spatial Time Division Multiple Access (STDMA), spectral efficiency primarily comes from the spatial reuse and concurrent transmissions that are outside the interference region. An STDMA schedule describes the transmission rights for each time slot in such a way that the communicating pairs do not interfere with each other. A scheduling algorithm may make use of signal quality between the transmitter and receiver. The metric used to denote signal quality or link quality is the signal interference noise ratio (SINR). In a large-scale wireless mesh network, not all sections of the mesh network may have a uniform interference environment. Further, the interference environment may not be accurately estimated. If a node or a set of nodes are affected by interference momentarily, or drop in performance, the central mesh router/scheduler can make use of link quality to reschedule for the entire mesh network.

The reporting time for a smart meter is always fixed and the TDMA scheduler component of the concentrator schedules periodic time slots for the links in the network. A link is a communication between two meters. For example, communication from meter 43 to concentrator 41 scheduled for a particular time slot is a link described as 43→41. For each scheduling period, the concentrator delivers a transmission schedule in a downlink, and collects the meter reading data during scheduled time slots in an uplink. The transmission schedule is calculated and the schedule sent once every scheduling period in the beacon (header slot). Therefore each scheduling period comprises a downlink period, during which the schedule is transmitted to the meters, and an uplink period, which is composed of time slots. The scheduling period is shown in FIG. 2. A period length is shown by the arrow labelled 50. The period is divided into a section in which the time slot schedule is broadcast 47 and a section in which the data is transmitted from the nodes 49. The schedule length is the length of time of the section of the period in which nodes are reporting data 49. This section is divided into time slots i, where i is a variable referring to a time slot in the schedule. An example time slot i is labelled 51. The schedule length may be described in terms of the number of time slots.

The meters transmit data in their scheduled time slots. The concentrator transmits a beacon at the beginning of the period that contains the schedule. The schedule comprises a schedule table that is transmitted to all the nodes. The schedule table contains node_ID information, and the time slots designated for each node to transmit. The beacon acts as a frame of reference in order that the nodes are synchronised. The time synchronization for each node in the network happens when each node registers itself with the network. The node will calibrate its own time reference with respect to that of the concentrator. The node_ID for the node within the network is also designated at this time. From this point onwards, all the nodes are synchronized within the network. For the purposes of rescheduling, the nodes within the mesh network will therefore be time-synchronized. Therefore although the beacon sent at the beginning of the period is actually received at different times at each node, the time reference is uniform within the network. For example, three nodes receive the beacon message at the $10^{th}$ msec, $15^{th}$ msec and $20^{th}$ msec respectively. If the time slot which is the $24^{th}$ msec to the 28th msec is allocated only to link 4, every node in the network is synchronised so that only the link 4 will be activated and use that slot.

In order that the period is shorter, and therefore the time between subsequent meter reading transmissions shorter, more than one node can be scheduled to transmit in each time slot. This reduces the number of timeslots and thus the overall schedule length.

The schedule should be calculated such that there are no transmission failures. Failure can be caused by collisions, and therefore two nodes should not transmit to the same node in one time slot. Further, one node should not both transmit and receive in the same time slot. In a wireless mesh network, simultaneous transmissions between different pairs of nodes can interfere with each other, and this can also cause failure of a transmission. There are several ways of scheduling transmissions to avoid interference. For example, a schedule can be produced in which no nodes within a certain distance of each other transmit in the same time slot. Alternatively, the SINR (Signal to Interference and Noise Ratio) can be used to determine if a transmission can be scheduled in a certain time slot. The SINR can be calculated for the transmissions in the time slot, and if it is above a certain threshold, the transmissions are considered successful. The transmission can therefore be scheduled in the time slot. SINR is described further below.

Consider a wireless mesh network of N nodes indexed as j=1 ... N. Let P be transmission power at every node and for simplicity let P be assumed to have a fixed value such that the value of P is the same for all the nodes and for each time slot. Power controlling algorithms can lead to excessively high transmit power, which is impractical in nodes having constraints on maximum transmit power. Therefore the transmit power is considered uniform at all wireless nodes (smart meters), that is all nodes transmit with the same power, which does not vary. Let $N_0$ be thermal noise density. The path loss between the transmitting node and receiving node is given by $P/D^\alpha$, where a is the path loss factor between the transmitting node and the receiving node, and D is the Euclidean distance between nodes. The path loss is the fraction of the transmitted power at the receiver node. Received power is therefore given by $P/D^\alpha$.

The path loss factor $\alpha$ is a number, for example, where a transmission is across open space, and there is line of sight between the transmitter and receiver, $\alpha$ will be equal to 2. For multipath reflection scenarios, $\alpha$ can be around 3 to 4. For more difficult reflections and indoor environments, $\alpha$ will be around 4.

The time slot duration equals the amount of time the node takes to transmit one packet over the wireless channel. A node can transmit all the information required to be transmitted in a single time slot. For example, meter 33 can transmit its data to meter 27 in a time slot. Meter 27 can then transmit the data from meter 33 and its own data to meter 31 in a second time slot. In this case the data from meter 31 and meter 33 is transmitted as one packet. Meter 31 can then transmit the data from meter 33, meter 27 and its own data in one packet and in one time slot. For a given time slot i, the $j^{th}$ communicating transmitter-receiver pair is denoted by $t_{i,j} \to r_{i,j}$. Let $S_i$ be the set of transmitter-receiver pairs which can communicate concurrently in the ith slot, that is $\{t_{i,1} \to r_{i,1}, \ldots t_{i,M_i} \to r_{i,M_i}\}$. Let $M_i$ denote the number of concurrent transmissions in the ith slot, i.e. $M_i = |S_i|$.

The SINR at receiver $r_{i,j}$ is given by:

$$SINR_{r_{i,j}} = \frac{P_R}{P_n + P_{int} + P_{ext}}$$

Where $P_R$ is the useful received power (that is the fraction of the transmitted signal with information that has reached the receiver), $P_n$ is the noise power (that is the thermal noise density), $P_{int}$ is the power from other nodes concurrently transmitting within the mesh network, and $P_{ext}$ is the power of the interference from external devices. All the power values in this equation refer to the power at the receiver $r_{i,j}$. For example, $P_{ext}$ is the power of the interference from the external devices at the receiver.

The aggregated interference $P_{int}$ at the receiver $r_{i,j}$ due to concurrent transmission within the mesh network is given by:

$$I_{r_{i,j}} = \sum_{\substack{k=1 \\ k \neq j}}^{M_i} \frac{P}{D^\alpha(t_{i,k}, r_{i,j})}$$

Where P is the power of the concurrently transmitting node, D is the distance between the concurrently transmitting node $t_{i,k}$ and the receiver $r_{i,j}$, and $\alpha$ is the path loss factor.

Figure 3A:
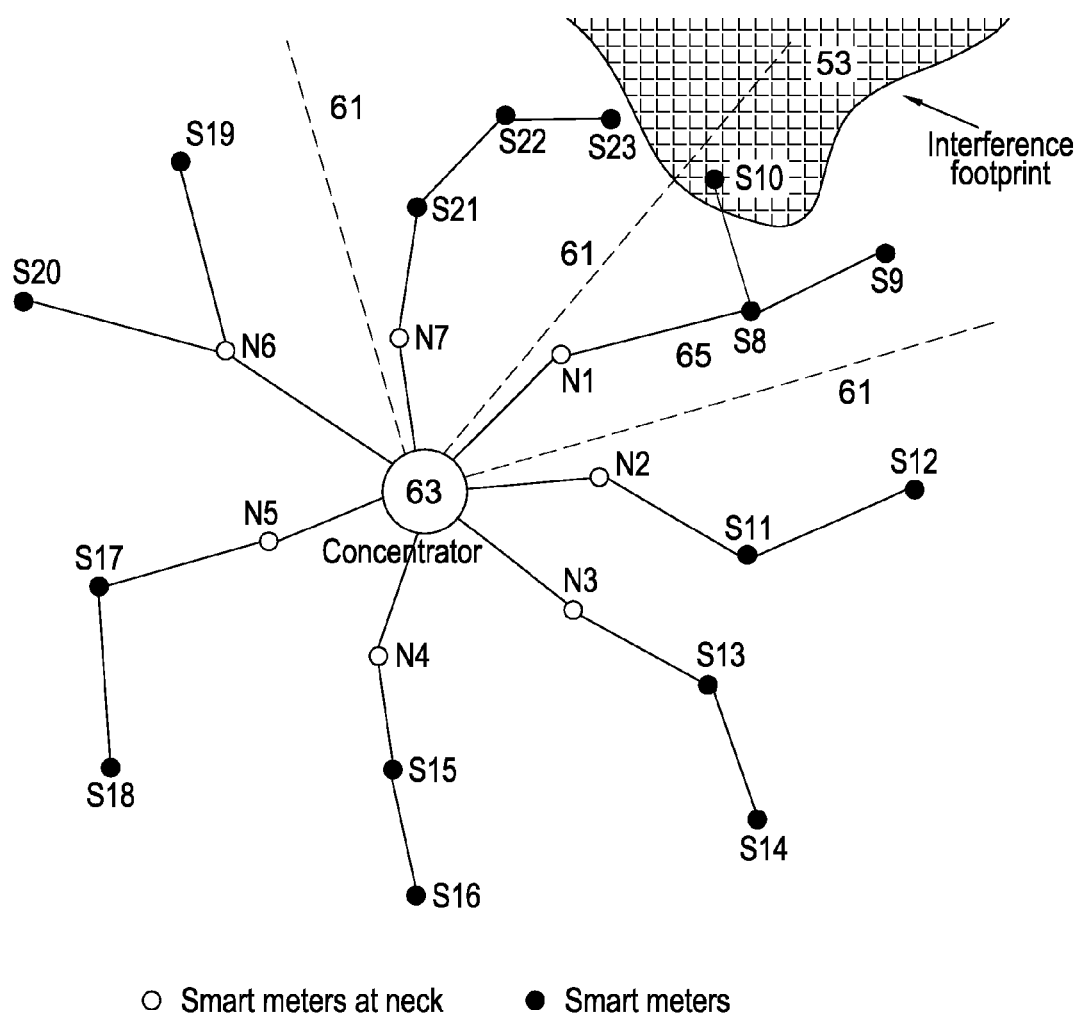
FIGS. 3a and 3b show an interference scenario and affected node in a sector-based mesh network.
Figure 3B:
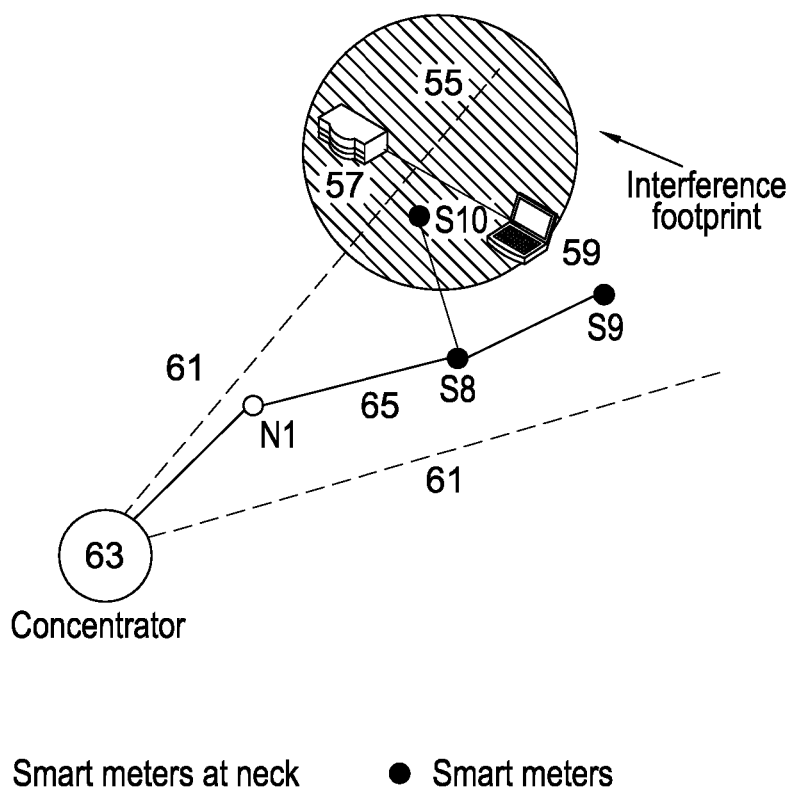

FIGS. 3a and 3b show the interference footprint from external devices. These figures show a diagram of the smart meter mesh network of FIG. 1, where the communication routes are shown as lines (such as 65). The sectors are shown divided by dashed lines 61 radiating outwards from the concentrator. The neck nodes (N1 to N7) are arranged around the concentrator and are directly connected to the concentrator 63. The other nodes (S8 to S23) are connected to the concentrator 63 through the neck nodes. For example, S8 is connected to the concentrator 63 through N1. S10 and S9 are both connected to S8, and are therefore both connected to the concentrator through S8 and N1. The interference footprint is shown in shaded regions with diagonal stripes 53 and 55.

In FIG. 3b, it can be seen that transmission between two external devices 57 and 59 causes an interference footprint 55. Any receiver or transmitter within this footprint will experience interference from the communication between the external devices 57 and 59. Therefore if node S8 transmits to node S10, node S10 may not receive the transmission as it is within the interference footprint 55. Similarly, a signal transmitted from S10 to S8 would be impaired by the interference.

The effect of the external devices, and whether a transmission from one node in the network to another node in the network will be interrupted by the external devices, must be taken into account when determining the SINR.

Operating spectrum bands influence how the external interference is modelled. For example, the wireless mesh network may be established as a secondary network in a spectrum sharing band, for example the TV white space spectrum 470-790 MHz. In this case, the TV transmissions are the primary network and have priority. In the absence of primary user transmission, the mesh network nodes act as secondary users. In this case therefore, the mesh network uses the band when it is not being used by TV transmissions. However, where TV transmissions are using the band in a different locality, these transmissions can cause interference to the network transmissions. The spurious signals from geographically adjacent TV transmitters using the same frequency band are therefore modelled as external interference.

As the location of the external interferer is not known, the channel gain cannot be estimated, and it is impossible to estimate the interference. Taking the worst-case scenario assumes that the interference, $P_{ext}$, can be modelled as Gaussian noise $N(0, \sigma_{ext}^2)$, in other words, the value of the external interference has a probability distribution with a mean of zero and an unknown variance, $\sigma_{ext}^2$. The above equation can be then be written as:

$$SINR_{r_{i,j}} = \frac{\frac{P}{D^\alpha(t_{i,j}, r_{i,j})}}{N_0 + \sum_{\substack{k=1 \\ k \neq j}}^{M_i} \frac{P}{D^\alpha(t_{i,k}, r_{i,k})} + N(0, \sigma_{ext}^2)}$$

The denominator of this equation is a summation of all the interference causing impairment to the signal (the thermal noise density, the interference due to concurrent transmissions in the network and external interference).

In another example, if the wireless mesh network is operating in the ISM bands (the industrial, scientific and medical bands) then any devices, including WiFi, ZigBee or numerous other devices, operating in the ISM bands will act as the external devices. The interference caused by these external devices in the ISM bands tend to be bursty-type traffic and difficult to model. However, the transmissions by the external devices cause temporal variations of the received signal. Unlike in the previous example, the interference will only exist for a few seconds. It is therefore not quantified as in the previous equation, and the equation for SINR can be written simply as follows:

$$SINR_{r_{i,j}} = \frac{\frac{P}{D^\alpha(t_{i,j}, r_{i,j})}}{N_0 + \sum_{\substack{k=1 \\ k \neq j}}^{M_i} \frac{P}{D^\alpha(t_{i,k}, r_{i,k})}}$$

The SINR can be calculated for a particular transmission in a particular time slot. If $(SINR_{r_{i,j}} \geq \gamma_c)$ then the transmission on that link in that time slot is considered successful, where $\gamma_c$ is the communication threshold. If a link is interrupted, there is a large drop or variation in received signal level. This drop and variation can be due to several factors: thermal noise, internal interference and external interference. Thermal noise is assumed to be a fixed value. The external interference cannot be controlled for the purposes of reviving an interrupted link. The internal interference, however, can be controlled. As it is not possible to differentiate the cause of the drop it is not possible to calculate the amount of external interference. In order to attempt to revive the interrupted link, the internal interference is reduced, which will reduce the overall interference and improve the overall SINR. The actual effect of the interference causing the interruption (both external and internal) is known only by the drop in actual received power. Therefore the rescheduling algorithm checks the level of drop in received power.

The communication threshold value is set such that the signal can be decoded properly. In other words, the communication threshold value is chosen such that the received power is large enough that the signal can be properly decoded. The receiver sensitivity is the threshold level above which the receiver can receive and decode the signal. The communication threshold value is chosen so that the receiver can receive and decode the signal. If it is too low, it is difficult to decode the signal. For example −110 dBm or any value below −100 dBm is too low. The thermal noise floor is around −115 dBm so that any signal below −100 dBm is considered as noise. Different network systems have different values for the communication threshold. For wireless sensor networks/WiFi networks, −70 dBm to −85 dBm is the minimum threshold to detect. A threshold of −85 dBm will mean that the node is an excellent receiver. The communication threshold value may be set to a fixed value above which the received signal can be decoded with a bit error rate (BER) of $10^{-3}$. The communication threshold value may be set at −85 dBm.

The spatial reuse at time slot i is the ratio of the number of successfully received packets summed over all $M_i$ to the number of events $M_i$, given by:

$$\sigma_i = \frac{\sum_{j=1}^{M_i} F(SINR_{r_{i,j}} \geq \gamma_c)}{M_i}$$

where F is the indicator function of event. For a particular transmitter-receiver pair communicating in time slot i, F is equal to 1 if the SINR for the transmission is greater than or equal to the communication threshold, and 0 if it is not. The spatial reuse for a particular time slot i is equal to the sum of F for all the transmitter-receiver pairs scheduled to transmit in time slot i, divided by the number of transmitter-receiver pairs scheduled to transmit in time slot i. The summation calculates all the successful links. If a link satisfies the threshold it is considered a successful link. The spatial reuse is the ratio of the successful links to the total links (the number of successful communications divided by the number of scheduled communications). If all packets are received correctly, then the total of the summation will be $M_i$, and the spatial reuse will be 1, meaning perfect reuse.

Interference at a receiver is an increasing function of the number of concurrent transmissions in a time slot. If too many transmissions are scheduled in a single time slot, the aggregate interference at a receiver may be high enough to drive the SINR below the communication threshold. This can lead to a drop in performance and even link failure. If a link failure is caused by interference from concurrent transmissions in the network, then it may be possible to recover the link by rescheduling some of the concurrent transmissions. In response to a link failure, the concentrator can initiate a rescheduling algorithm designed to reduce the interference from concurrently transmitting nodes at the affected receiver node. The rescheduling algorithm will only be effective at recovering the link if the failure of the link is due primarily to interference from other nodes in the network. This must be distinguished from link failure due to other causes, in order to avoid unnecessary rescheduling. For example, if the failure of the link is due to a power outage, it is inefficient if the concentrator initiates the rescheduling algorithm in order to recover the link.

A link failure can be due to the combined effect of aggregate interference of concurrent transmissions and unknown external interference. As the location of the external interferer is not known, nor the channel gain or periodicity, it is impossible to estimate the interference caused due to external devices. The worst-case scenario is therefore assumed, and the external interference is modelled as Gaussian noise $N(0, \sigma_{ext}^2)$. If the cause of the link failure is in fact due to severe external interference, then rescheduling may not recover the link. In other words, if $P_{ext} > P_{int}$, the drop is so severe it could not be recovered through rescheduling. In this case, switching to a different frequency channel is the only option to re-establish the link.

It is also important to differentiate between a power outage and a communication outage. This is possible in smart grid and AMI paradigm, as smart meters can transmit real-time power outage alerts to utilities. The smart meter will send an alert to the concentrator if it loses power, described as a "last gasp". If the concentrator receives this alert, it will not attempt to reschedule in order to reduce interference and revive the link.

It is important to differentiate between performance degradation of a few milliseconds due to temporal variations and total link failure beyond the latency threshold (in the order of few seconds or minutes for smart meters). The concentrator can determine that a link has failed and rescheduling should be attempted only if a certain number of successive data meter readings are missed. For example, if the smart meter fails to transmit four successive data meter readings, the communication link is assumed to have failed, and the rescheduling procedure is initiated.

The rescheduling algorithm is therefore activated only when the latency level exceeds the threshold level and the interruption is identified as link failure (i.e. four successive data readings are missed) and it is identified that there is a possibility of recovering the link through rescheduling (i.e. no power outage alert has been received). A link can be considered interrupted if the received power for the transmission falls below a certain threshold value. The threshold value can be set such that the data is still received, but the interference level is high, therefore it is preferable to reschedule the network. In this way, the network can respond to a drop in performance of a link, and the link can be rescheduled before the interference is so high as to cause total failure of the link. For example, the rescheduling algorithm can be activated if the actual received power for four successive data readings is below a threshold value. In this case the receiver node for the link transmits information indicating that the actual received power for the transmission on the link is below a threshold value. This information is communicated to the concentrator through the mesh network. When the concentrator detects this information in four successive periods, the link is designated as interrupted, and the rescheduling algorithm activated. The receiver can also detect that there is a difference in the signal level between successive transmissions. The receiver may detect that the signal level is dropping, and that there are large variations in the signal level between successive transmissions. This can be detected as an interruption of the transmission at the receiver, and a signal is then communicated to the concentrator containing information indicating that the link is interrupted.

It is assumed that due to the severity of the interference, both the downlink beacon scheduling information and the uplink data measurement information are disrupted. So, any control message from the concentrator instructing the affected node to switch to another time slot is not effective. As the interference is so severe it has disrupted the transmission of data from the node, it is likely that it will also disrupt transmission of a rescheduling message to the node. Therefore, it is not possible to reschedule the affected transmission, as it is not possible to send or receive any information. Since the receiver node is experiencing interference it cannot receive the message to reschedule. Instead, other transmissions in the same time slot are rescheduled. The algorithm reschedules the links in the same time slot selectively, in order to reduce the number of steps for rescheduling. The rescheduling is done locally for selected concurrent links in the affected time slot. The number of steps for rescheduling can be significantly lower than for full rescheduling of the entire network.

In the finalized new schedule, the links have been carefully rescheduled such that the internal interference caused by other nodes in the network concurrently transmitting is minimal and the overall SINR improved such that the downlink as well as the uplink will be revived. The rescheduling is an iterative procedure. If the link is not recovered (meaning the SINR is still below the threshold) the downlink message will not reach the interrupted link and the rescheduling is not complete. The rescheduling is complete only when it is estimated that the downlink signal will reach the intended receiver. Only when the sector-based rescheduling has minimized interference such that it is estimated that the interrupted link will receive the schedule downlink is the final output schedule sent to the interrupted node.

Further, if the interrupted link is used to connect further nodes to the concentrator, then any control message instructing these further nodes to switch to another time slot may also not be effective. Other links which are connected to the concentrator through the interrupted link may be unable to receive a rescheduling signal, as the rescheduling signal cannot be transmitted through the interrupted link in order to reach them. If the interrupted link is in the middle of a tree, all the links branching off from the interrupted link may not receive the rescheduling signal. If the interrupted link is at the end of a tree, then the effect is limited to the interrupted link.

Selectively rescheduling links is performed by an adaptive scheduling algorithm. The algorithm is adaptive in the sense that it can adapt to any changes in the link conditions, such as a link being interrupted. The rescheduling method adaptively link schedule different sectors of the wireless mesh network to minimise the aggregated interference, thereby providing stability and reliability to the affected wireless links. The link scheduling is neck-node centric and exploits sector localisation and the interference perceived by the link, the SINR. The number of concurrent transmissions scheduled in a time slot is controlled for different sectors of the network, where the sectors are identified by their neck nodes. The aggregated interference in a sector is controlled, and the nodes scheduled with respect to the link quality (SINR), where one or more node failure is detected. Minimizing aggregate interference in the precinct of the affected node improves the chances of link revival. The rescheduling is done locally for selected concurrent links in the affected time slot. The number of steps for rescheduling is significantly lower than the full rescheduling. The method is adaptive and robust against any change in interference. The scheduling algorithm is scalable as it allows the network to estimate the scalability from the realistic spatial and temporal conditions. The scheduling algorithm is scalable as the number of computational steps is still feasible as the network size grows.

By minimizing the interference caused by the concurrent transmissions in the mesh network, the overall interference is minimized. If still the link does not recover after this local rescheduling procedure, then the affected node has no alternative but to switch to a different frequency channel as a last resort. The rescheduling algorithm prioritises rescheduling of the set of concurrent transmissions in the affected sector and the neighbouring sectors. Each sector is rescheduled in turn, working outwards from the sector of the affected node.

The transmissions in the sectors closest to the sector of the interrupted transmission are likely to have a larger effect on the SINR of the interrupted transmission and therefore these links are rescheduled first. These links are likely to be closer to the interrupted link. However, the allocation of nodes to a particular sector can also be dependent on other factors than proximity. For example, in FIG. 1a, node 30 appears equidistant from nodes 28 and 26. If the interference is less for the link between node 30 to neck node 26 than for link 30 to 28, then the node 30 will be configured to transmit to node 26. It will therefore be in the sector identified by neck node 26. If the nodes 28 and 26 are equidistant from node 30, the difference in interference between the links could be due to an external source of interference, or even due to a barrier such as a wall between the nodes 30 and 28. The allocation of node 30 to sector 26 in this case therefore indicates that transmission from node 30 is more likely to cause interference for other links in sector 26 than it is for other links in sector 28. For this reason, rescheduling by sector allows the links that are most likely to cause a large contribution to the interference to be rescheduled first. It is possible to identify the sector of a link from the network topology information designating the communication routes of the nodes (and not necessarily their geographical position). The aim is to limit the aggregate interference due to nodes in the sector.

Figure 4A:
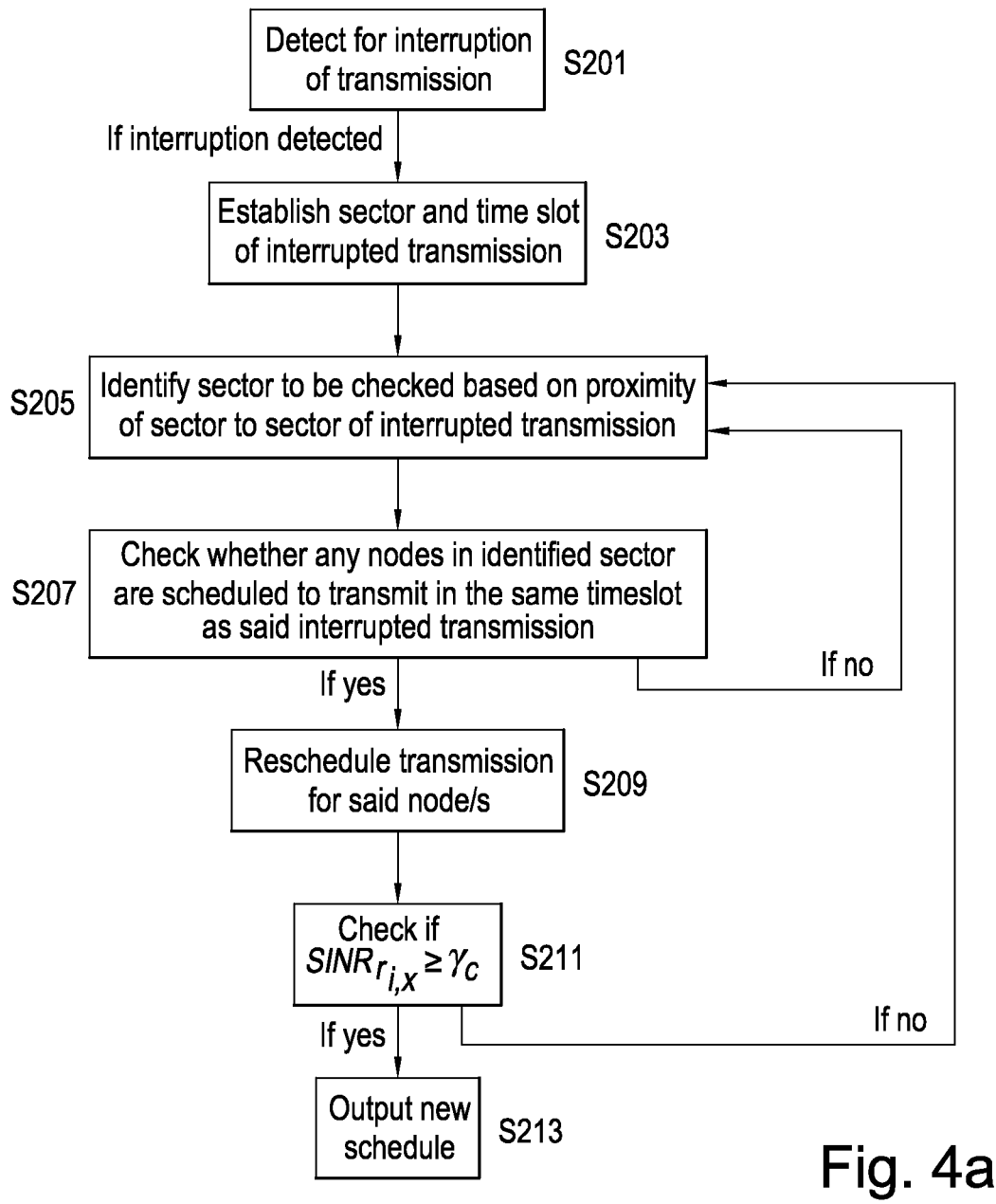
FIG. 4a shows a flow chart illustrating a method according to an embodiment.

FIG. 4a shows a flow chart illustrating a method according to one embodiment. The concentrator detects for interruption of a transmission in step S201. Detecting for interruption of a transmission involves detecting for the case where data from a particular node has not been received in four successive time periods.

In order to perform the rescheduling, information about the topology of the mesh network is used. This information is stored at the concentrator. The concentrator also has information stored regarding the transmission schedule, specifically which nodes are scheduled to transmit in each time slot.

The concentrator detects for a case where data from a node expected to be received in a period has not been received. In each period, it is expected to be received at the concentrator a signal which indicates that the data contained in the signal originates from a particular node. In any period, if it is detected that this signal has not been received, then this is registered. The concentrator detects for the case where the signal is not received for four successive time periods.

The interruption of a link in the network can interrupt the transmission of data from more than one node. For example, in FIG. 3a, if link S8 to N1 is interrupted, the concentrator will not receive data from nodes S8, S9 and S10. If it is detected that data has not been received from nodes S8, S9 and S10 in four successive periods, it will be identified that a link is interrupted. However, further steps are needed to be performed in order to detect that the link S8 to N1 in particular is interrupted. The stored information which indicates the communication route for each of the nodes for which data has not been received is used to determine which link is interrupted. The interrupted link is identified as the link with the fewest number of hops between it and the concentrator.

The step of identifying the interrupted link is now described in detail for an example schedule for the network shown in FIG. 3a. The schedule is as follows. Node S9 transmits its data to node S8 in time slot 1. Node S10 transmits its data to time slot S8 in time slot 2. Node S8 transmits its data to node N1 in time slot 3, transmits S9s data to N1 in time slot 4, and transmits S10s data to N1 in time slot 5. Node N1 transmits its data to the concentrator 63 in time slot 6. Node N1 transmits the data from node S8 to the concentrator in time slot 7, the data from node S9 in time slot 8 and the data from S10 in time slot 10. If link S8 to N1 is interrupted, data will not be received at the concentrator in time slots 7, 8 and 10 from node N1. It is detected whether this also occurs in the next three periods. If this is satisfied, it is then determined from the stored schedule information that the data transmitted to the concentrator in these time slots is the data from nodes S8, S9 and S10. The stored network topology information is checked to identify which of these nodes is the least number of hops from the concentrator. Link S8 to N1 is established as the likely interrupted link. This completes the requirements for the detection of the interruption, and S203 is initiated.

In step S203, the sector and time slot of the interrupted transmission is established. In other words, the neck node through which the interrupted link is configured to communicate with the concentrator and the time slot of the transmission are identified. For the example discussed above, where it has been established that the link S8 to N1 is interrupted, the stored network topology information is used to identify the sector of the transmitter node of the interrupted pair. The transmitter node S8 is connected to the concentrator through neck node N1. This sector identified with neck node N1 is the sector of the interrupted transmission.

In order to establish the time slot of the interrupted transmission, the schedule table is checked, and it is established that link S8 to N1 is scheduled for time slot 3.

In the next step S205, the sector to be checked is identified. The sector of the affected transmission is the first sector identified to be checked. The concentrator refers to the schedule for the mesh network, and identifies any nodes in the sector to be checked that are scheduled to transmit during the time slot of the affected transmission in step S207.

In subsequent iterations of the algorithm, adjacent sectors are identified to be checked, working outwards from the sector of interrupted transmission. Stored information about the network topology is used to identify which sector is adjacent, and which nodes are in the sector identified. The neck node of the sector of the interrupted transmission has been identified in step S203. In step S205, this sector is first identified to be checked. If the algorithm runs through step S205 a second time, then the next sector to be identified to be checked is chosen by identifying the sector which is adjacent to the sector of the interrupted transmission, according to the network topology information.

Once the sector is identified, the network topology information is used to determine which nodes are in the sector. The nodes in a sector are defined as all the nodes that communicate with the concentrator through the same neck node. Stored information about the schedule is then used to determine if any of the nodes in the sector identified are scheduled to transmit in the same time slot.

In the flow chart shown in FIG. 4a, if a node (or nodes) is identified that transmits in the same time slot as that in which the transmission is scheduled on said interrupted link, then the identified transmission is rescheduled in step S209. If more than one node is identified, the first node identified is rescheduled in step S209. The rescheduling step S209 comprises checking each time slot in the schedule, to determine whether rescheduling the link to that time slot results in the SINR of the link increasing to greater than the communication threshold value. The rescheduling step also comprises selecting the time slot for which the SINR is the largest value, and rescheduling the link to that time slot. If no time slots can be found for which the SINR is greater than the communication threshold then a new time slot is created and the transmission scheduled in the new time slot.

The step of determining the SINR for the rescheduled link if it were rescheduled to each time slot in the schedule is as follows. The external interference and the thermal noise are assumed to be the same for a transmitter-receiver pair for each time slot in the period. The actual received power from the previous transmission for the link that is to be rescheduled is used to calculate a value for the combined contribution of the external interference and the thermal noise density. This is calculated from the equation for SINR for the transmission on the link to be rescheduled for the original time slot (the time slot of interrupted transmission). The values for the transmitted power and transmission distance of the link to be rescheduled are known from the network information stored at the concentrator, and therefore the term $$\frac{P}{D^\alpha(t_{i,j}, r_{i,j})}$$

is known. The term for internal interference is also known, as the transmission powers and the distances for all the links scheduled to transmit concurrently are known from the stored network information, and therefore $$\sum_{\substack{k=1 \\ k \neq j}}^{M_i} \frac{P}{D^\alpha(t_{i,k}, r_{i,k})}$$

is known. A value for the combined thermal noise density and external interference can therefore be calculated from substituting the value of the actual received power for the previous transmission on the link to be rescheduled for the SINR term in the equation.

Once a value for the combined contribution of the external interference and thermal noise has been determined, then the estimated value of the SINR can be calculated for the link to be rescheduled for each time slot in the schedule. The known values are used to calculate the term $$\frac{P}{D^\alpha(t_{i,j}, r_{i,j})}.$$

The previously calculated value for the combined contribution of the external interference and thermal noise is used to replace these terms. The sum $$\sum_{\substack{k=1 \\ k \neq j}}^{M_i} \frac{P}{D^\alpha(t_{i,k}, r_{i,k})}$$

is performed over all the links scheduled to transmit in the particular time slot. If the newly calculated SINR is greater than or equal to the communication threshold, then the time slot is considered to be a candidate for rescheduling. If none of the time slots results in an SINR above the communication threshold, then a new time slot is created. The time slot for which the calculated SINR is largest is selected for the link to be rescheduled to.

In step S211, the SINR of the interrupted link is checked based on the updated schedule, to determine if removing the concurrent transmission/s has improved the SINR such that it is now above the communication threshold value. If the SINR is greater than or equal to the communication threshold value then the rescheduling is considered successful, and the new schedule is output in step S213. If not, and more than one node was found in the sector identified to be checked, then the next node found in the sector identified is rescheduled, and the SINR checked. The process iterates between steps S209 and S211 for all the nodes found in the sector identified. If only one node was found in the sector identified, and in any case once the algorithm has iterated through all the nodes found in the sector identified, the algorithm returns to step S205, and the next sector is identified to be checked.

The step of checking the SINR comprises calculating the new SINR without the contribution from the rescheduled link from the equation for SINR. The external interference and the thermal noise are assumed to be constant. The actual received power from the interrupted transmission is used to calculate a value for the combined contribution of the external interference and the thermal noise density. This is calculated from the equation for SINR. The values for the transmitted power and transmission distance of the interrupted transmission are known from the network information stored at the concentrator, and therefore the term $$\frac{P}{D^\alpha(t_{i,j}, r_{i,j})}$$

is known. The term for internal interference is also known, as the transmission powers and the distances for all the links scheduled to transmit concurrently are known from the stored network information, and therefore $$\sum_{\substack{k=1 \\ k \neq j}}^{M_i} \frac{P}{D^\alpha(t_{i,k}, r_{i,k})}$$

is known. A value for the combined thermal noise density and external interference can therefore be calculated from substituting the value of the received power for the interrupted transmission for the SINR term in the equation.

Once a value for the combined contribution of the external interference and thermal noise has been determined, then the estimated value of the SINR can be calculated without the contribution from the rescheduled link. The known values are used to calculate the term $$\frac{P}{D^\alpha(t_{i,j}, r_{i,j})}.$$

The calculated value for the combined contribution of the external interference and thermal noise is used to replace these terms. The sum $$\sum_{\substack{k=1 \\ k \neq j}}^{M_i} \frac{P}{D^\alpha(t_{i,k}, r_{i,k})}$$

is performed, without including the rescheduled link. If the newly calculated SINR is now greater than or equal to the communication threshold, then the rescheduling is considered successful. If not, and more links are required to be rescheduled, then the SINR will be calculated again, this time removing the contribution from the next link that has been rescheduled. The value for the combined contribution of the external interference and the thermal noise (calculated from the original actual received power of the interrupted transmission) will be the same for each calculation.

If no nodes are found in the identified sector that transmit at the same time as the interrupted node was scheduled to transmit, then the next sector is identified to be checked in step S205. This also happens if all the nodes in an identified sector have been rescheduled and the SINR in step S211 is still not above the communication threshold value.

As discussed above, the next sector is identified based on its proximity to the sector of interrupted transmission. Proximity is determined from stored network topology information designating the adjacent sectors. The adjacent sector can be identified simply by using the neck-node_ID information. The rest of the steps are repeated with the new identified sector. Once the interrupted link is revived through rescheduling, then the new schedule is finalised and the output new schedule is sent to all the nodes in the network at the start of the next scheduling period.

Detecting for interruption of a transmission can involve detecting for the case where data from a particular node has not been received in more or less than four successive time periods. The step of detecting for interruption of a transmission can also involve detecting for the case where no power outage alert has been received when data is detected not to have been received in four successive time periods. In this case, if data is not received in four successive time periods, the algorithm only proceeds to step S203 if no power outage has been received.

Detecting for interruption of a transmission can comprise detecting for a signal containing information indicating that the received power for the transmission on the link is below a certain threshold value. The threshold value is set such that the data is still received, but the interference level is high, and therefore it is preferable to reschedule the network. The concentrator responds to a drop in performance of a link by rescheduling before the interference is so high as to cause total failure of the link. Detecting for interruption of a transmission can comprise detecting that the actual received power for four successive data readings is below a threshold value. Detecting for interruption of a transmission can comprise detecting for a signal containing information from the receiver node for the link indicating that the actual received power for the transmission on the link is below a threshold value. This signal may have been communicated to the concentrator directly from the receiver node, in the case that the receiver node is also a neck node, or communicated through several hops through the mesh network. Detecting for interruption of a transmission can comprise detecting for this information in four successive periods. Detecting for an interruption of a transmission can comprise detecting for a signal containing information indicating that the receiver for a link has registered a difference in signal level between successive transmissions. The information can indicate that the receiver has registered the signal level is dropping, and that there are large variations in the signal level between successive transmissions.

In order to perform steps 203 onwards, the concentrator can request information regarding the topology of the network from an external location, rather than using information stored at the concentrator.

In step S203, the sector of the receiver node, rather than the transmitter node, can be used to identify the sector of the interrupted link.

Identifying the adjacent sector in step S205 may involve identifying the two neck nodes that are closest to the neck node of the interrupted sector. This is based on the assumption that the proximity of a sector to the sector of interrupted transmission correlates to the proximity of the neck node to the neck node of the sector of interrupted transmission. However this may not necessarily be the case. Alternatively therefore, the adjacent sectors may be identified as the two sectors for which there are no nodes from another sector between the nodes of these sectors and the sector of interrupted transmission. The neck-node_ID information stored at the concentrator can designate which sectors are adjacent. For example, the neck-node_ID numbers may be consecutive for adjacent sectors. In this case, identifying the adjacent sector involves simple identifying the neck-nodes with neck-node_ID±1 from the neck-node_ID of the interrupted sector. For example, if the interrupted sector is that identified with neck node of neck-node_ID N5, then the adjacent sectors are those identified with neck nodes with neck-node_ID N4 and N6. Identifying the next sector to be checked can comprise identifying a sector that has not been checked, and that is adjacent to a sector that has been checked.

In most network topologies, there will be two adjacent sectors to each sector. If there are two adjacent sectors (i.e. one each side of the sector of interrupted transmission) then either may be chosen as the sector identified to be checked first. The algorithm with run through the steps with one of the sectors, and then if the SINR is not greater than the communication threshold, return to step S205 and identify the second adjacent sector as the sector to be checked. In this case, one sector is chosen first at random (e.g. the sector with neck-node_ID+1 from the neck-node_ID of the neck node of the sector of interrupted transmission is chosen first). It is still considered in this case that the sector is chosen based on proximity, as it is chosen as one of the two closest sectors. Alternatively, the two sectors could both be identified together in step S205 and both checked in the same steps. Alternatively one may be identified as the adjacent sector based on proximity.

The first sector to be checked may not be the sector of interrupted transmission. Instead, the algorithm may begin with one or both of the adjacent sectors.

The step of determining the SINR for the rescheduled link for each time slot in the schedule of step S209 can alternatively use measured values of received power. For example, once a link has been identified to be rescheduled, a new schedule can be sent to the nodes in the next downlink period. The new schedule is such that the link identified to be rescheduled is now scheduled in every time slot in the schedule except its original time slot (i.e. the time slot of interrupted transmission). Alternatively, it can be scheduled in every time slot in the schedule other than the time slots where one of the nodes in the link identified to be rescheduled is scheduled to receive from another node or to transmit to another node. Alternatively, there may be other constraints on the time slots available for rescheduling, and it is scheduled into all available time slots.

The nodes then transmit their data using multi hop communication according to the new schedule for at least one whole period. The actual received power values, measured at the receiver node in the link identified to be rescheduled, for each time slot in the schedule, are communicated to the concentrator. In other words, the receiver node includes the information indicating the received power for each transmission received in each time slot in the data packet sent to the next node in the multi hop communication. It may be that the receiver node includes the information indicating the received power for each transmission received in only the time slots prior to the time slot for which the receiver node is scheduled to transmit to the next node. In this case, if all the time slots in the schedule do not fall before, then the received power for the identified link from the time slots which fall after can be transmitted to the next node in the next period. The concentrator will have received a set of values that correspond to the actual received power at the receiver node for the link identified to be rescheduled, obtained where the transmission is scheduled in each available time slot in the schedule. These values correspond to the measured SINR of the link in each time slot, and can each be compared to the communication threshold value.

If the measured SINR for a time slot is greater than or equal to the communication threshold, then the time slot is considered to be a candidate for rescheduling. The time slot for which the measured SINR is largest is selected for the link to be rescheduled to. If none of the time slots results in an SINR greater than or equal to the communication threshold, then a new time slot is created.

The rescheduling step S209 can alternatively consider time slots for rescheduling the identified link to only if they fall before the time slot in which the receiver is scheduled to transmit to the next node in the schedule. For example, if link 33 to 27 in FIG. 1 is identified to be rescheduled, and link 27 to 31 is scheduled in the $8^{th}$ time slot in the schedule, then only time slots 1 to 7 may be considered as candidates for rescheduling. This is because node 27 must transmit the data from node 33 to node 31 after it has been received from node 33. There may be further rescheduling constraints built in to the algorithm, for example, the identified link cannot be rescheduled to a time slot in which one of the nodes in the identified link is scheduled to transmit or receive to another node. Further, it may be required to be scheduled in a time slot that is after a time slot in which nodes further away from the concentrator, for which the nodes of the interrupted link act as relay nodes, have transmitted their data. The time slots to be considered may therefore be those that fall after a certain time slot and before another time slot, giving a limited range of time slots to be considered. These constraints can apply whether measured or calculated SINR is used in the algorithm.

The rescheduling step S209 can alternatively comprise simply creating a new time slot, and rescheduling the concurrent transmission or transmissions found in the sector identified to the newly created time slot. The new time slot may be created at the end of the schedule. Alternatively, it may be created immediately after the time slot of interrupted transmission, in order that the multi hop communications remain in the correct order. In this embodiment of the algorithm, the steps of checking the existing time slots are removed. All the concurrent transmissions from the sector identified may simply be rescheduled to a newly created time slot in one step. In another embodiment, if more than one node is identified for a sector, all of the existing time slots may be checked to ascertain if one is suitable for rescheduling for the first node found for the identified sector. If this is unsuccessful and a new time slot must be added to the schedule, then the algorithm may simply reschedule all of the concurrent transmissions found in the sector identified to the newly created time slot in one step. This will reduce the number of steps for checking all of the existing time slots in the schedule for each of the concurrent transmissions in the sector in the case where it has already been determined that a new time slot must be created for one of the links.

The step of checking the SINR in S211 can alternatively comprise using the actual received power. When a link is identified in step S207, and rescheduled in step S209, a new schedule, in which the link is not scheduled in the time slot of the interrupted transmission is sent to the nodes in the next downlink period. For example, in the case where the rescheduling step S209 is performed based on the received actual power, the same received power data can be used in step S211. In other words, a schedule such that the link identified to be rescheduled is newly scheduled in every time slot in the schedule except its original time slot (i.e. the time slot of interrupted transmission) is sent to the nodes. The nodes then transmit data using multi hop communication according to the new schedule for one whole period. The actual received power value, measured at the receiver node of the interrupted link is communicated to the concentrator. The receiver node of the interrupted link therefore includes information indicating the received power for the formerly interrupted transmission in the data packet sent to the next node in the multi hop communication. The concentrator then receives this information through the multi hop communication. This actual received power is the measured SINR of the interrupted link, measured without the contribution from the link identified to be rescheduled, and it is then compared to the communication threshold value.

If the measured SINR is greater than or equal to the communication threshold, then the algorithm goes to step S213 and outputs the new schedule. If the measured SINR is not, then more links are required to be rescheduled, and the algorithm returns to step S205 to identify the next sector.

Rather than sending a new schedule to every node in the network in step S213, a control message from the concentrator may be sent instructing the relevant nodes to switch to another time slot.

Figure 4B:
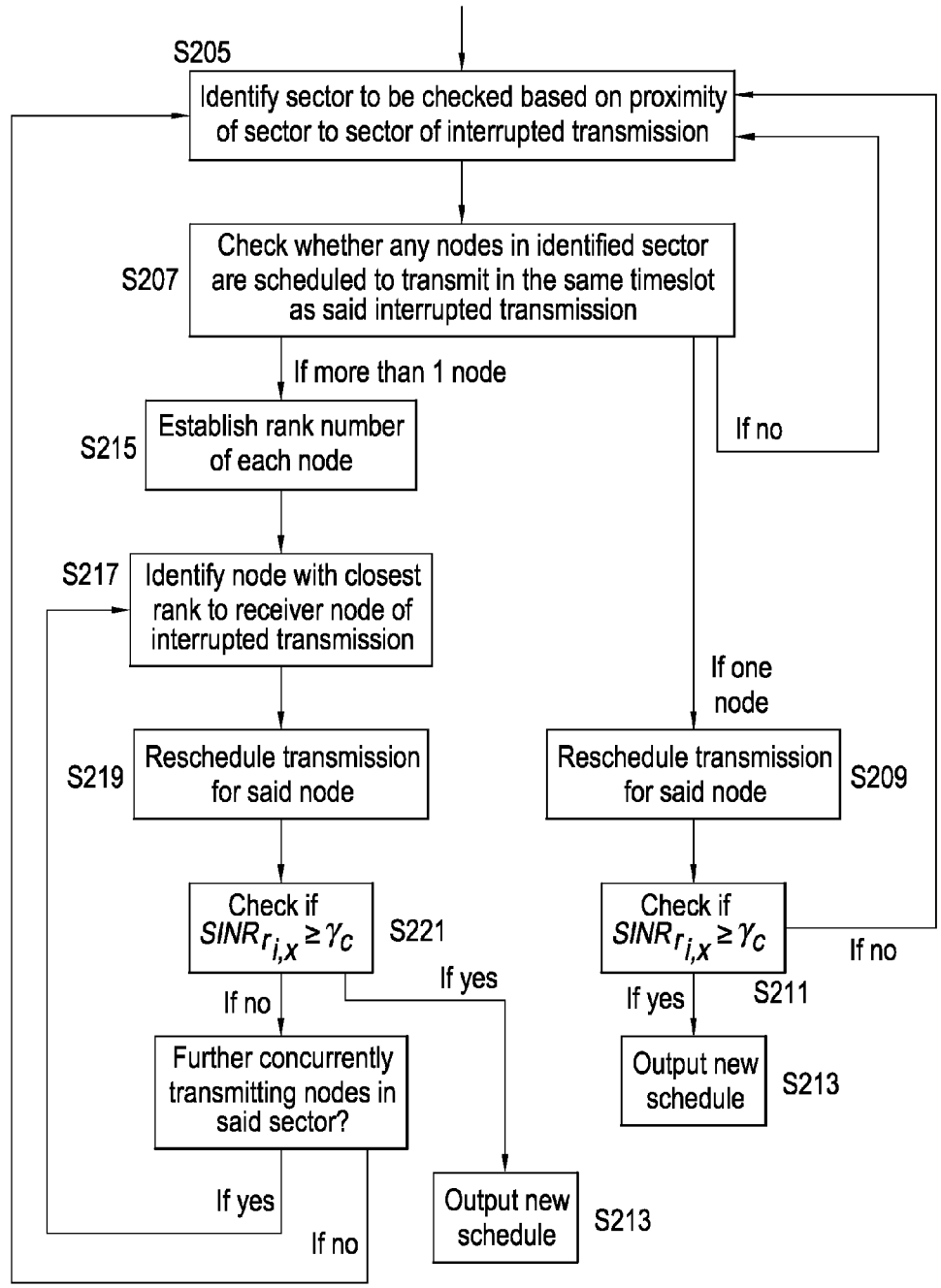
FIG. 4b shows a flow chart illustrating a method according to an embodiment.

FIG. 4b shows a flow chart illustrating a method according to another embodiment, where if more than one node in an identified sector is scheduled to transmit in the same time slot as the interrupted link, then the node that has a rank closest to the rank of the affected receiving node is rescheduled first. Steps S201 to S207 are the same as in FIG. 4a. If only 1 node is found to be scheduled to transmit in the time slot, then the method proceeds through steps S209 to S213 as in FIG. 4a. If no nodes are found to transmit in the time slot then a new sector is identified in step S205 (as in FIG. 4a).

However, if more than 1 node is found to transmit in the time slot, then the node chosen to be rescheduled first is chosen based on its rank. The rank of a node designates how many hops it is from the concentrator. For example in FIG. 1, node 31 is identified with a rank number of 1 as it is 1 hop from the concentrator. Node 27 would have a rank number of 2. In step S217, a node is identified to be rescheduled based on its rank and the rank of the receiver node of the interrupted link. For example, if the receiver of the interrupted link has a rank of 5 and in the identified sector, nodes of rank 13 and 10 are scheduled to transmit in the time slot, the node with rank 10 is chosen. The SINR is then checked. If it is above the communication threshold value, then the new schedule is outputted in step S213. If it is not greater than or equal to the communication threshold value, then the algorithm returns to step S217 and the node with the next closest rank is chosen to be rescheduled. If there are no further nodes in the identified sector then the algorithm returns to step S205 and the next sector is identified.

In the case where two nodes with rank equally close to that of the receiver of the interrupted link are found, then either node may be rescheduled first, or both nodes may be rescheduled.

The method shown in FIG. 4b could be used for a large mesh network, where it is possible many links may be found for a particular sector. Basing the order of the rescheduled links on rank means that those links closest to the interrupted link are rescheduled first. These are the links which are more likely to interfere with the transmission. In other words, links that are closer to the interrupted link are likely to have a larger effect on the SINR and should therefore be rescheduled first. Rescheduling the links with similar rank first means that it may not be necessary to reschedule as many links. This could be more useful for any mesh network that has few neck nodes compared to the total number of nodes. In this case, a large proportion of the nodes may be in a single sector.

Figure 4C:
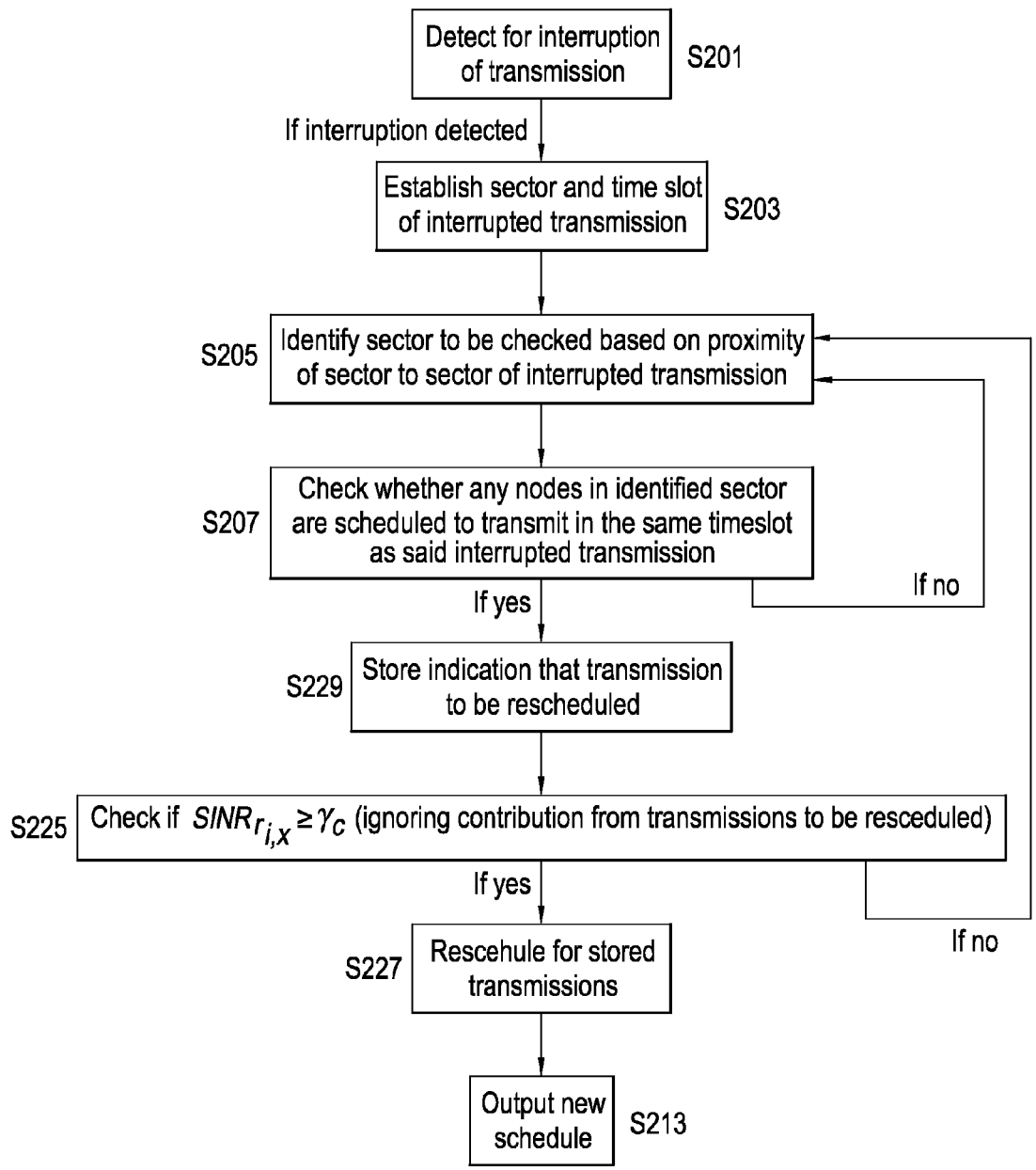
FIG. 4c shows a flow chart illustrating a method according to an embodiment.

FIG. 4c shows another embodiment, where after step S207, information indicating the transmission or transmissions to be rescheduled is stored in step S229. The SINR of the interrupted link is then checked in step S225, without the contributions from transmissions for which information is stored indicating that they are to be rescheduled. If the SINR is not greater than or equal to the communication threshold, then the algorithm returns to step S205, and identifies the next sector to be checked. If the SINR is greater than or equal to the communication threshold value then the rescheduling is performed in step S227 for all the transmissions for which information is stored indicating that they are to be rescheduled. The new schedule is output in step S213.

Figure 5:
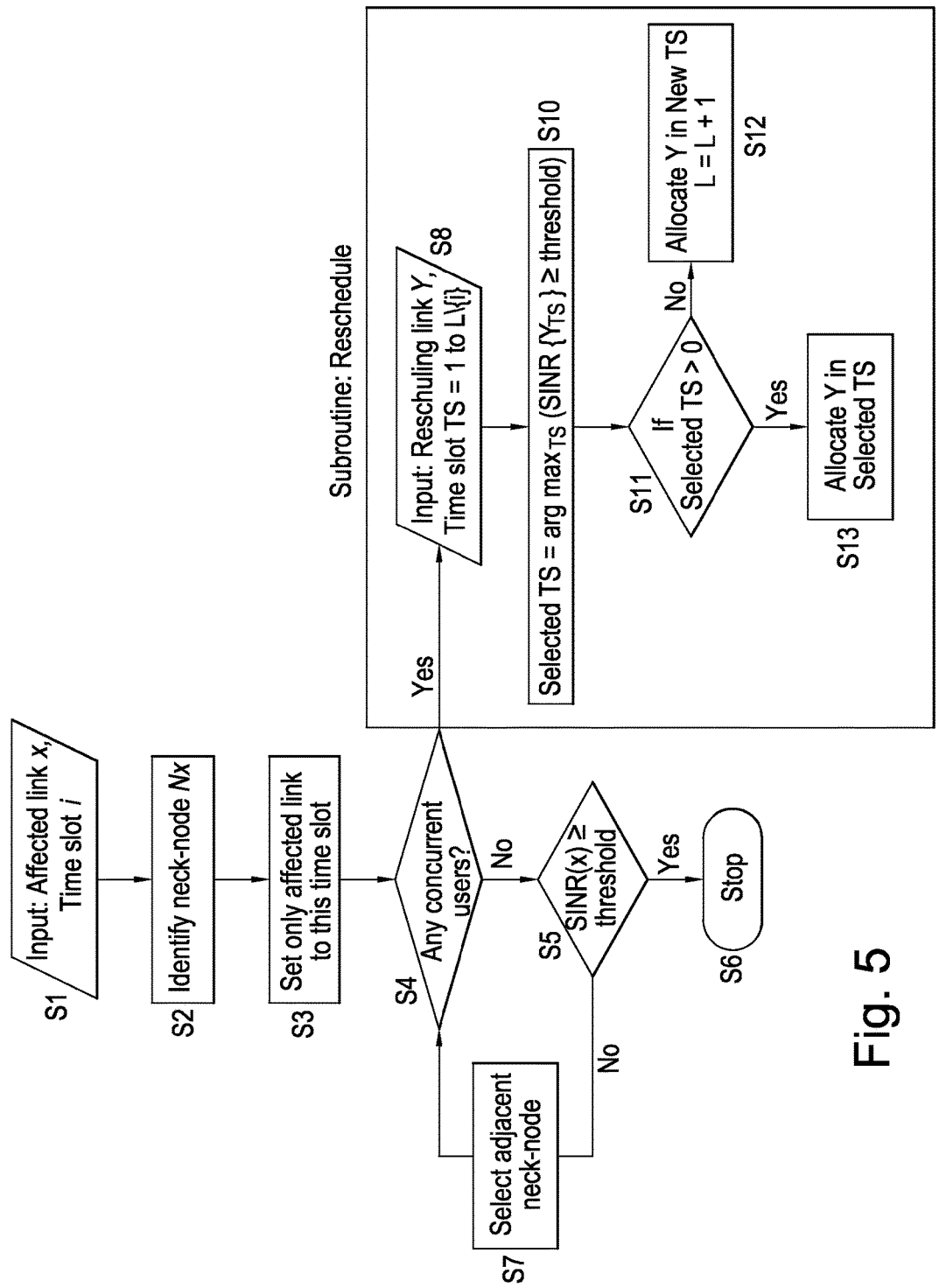
FIG. 5 shows a flow chart illustrating a method according to an embodiment.

FIG. 5 shows a flow chart illustrating a method according to an embodiment. The method of rescheduling involves resolving or minimising aggregated interference by adaptively link scheduling different sections of the wireless mesh network. A concurrent transmission in the selected part of the network is rescheduled. By rescheduling only selected concurrent transmissions, the total number of steps to reschedule until the link is revived is less compared to full rescheduling of the entire network. In the method, the affected or interrupted links are identified and referenced through their neck nodes. Other links in the same timeslot in selected sectors are rescheduled such that the affected node has minimal aggregated interference. The links that are rescheduled are scheduled to new time slot such that the performance of the rescheduled link is improved or unaffected. The method also gives the ability to assess the scalability of a concentrator, i.e. the number of nodes in a given locality and for a given channel. Each concentrator can accept only a limited number of nodes. If there are more than a certain number of nodes, then the schedule length is so long that there will be a noticeable delay. For example, if the maximum latency allowed between two consecutive packets from the same concentrator is 2 seconds, and the maximum schedule length comprises 200 time slots with 10 msec each. Any additional time slot added to the schedule would then increase the latency between consecutive packets over the allowable level.

The figure shows the rescheduling algorithm. Information identifying the affected link (the transmitter-receiver pair that are detected as interrupted) and the time slot of the interrupted transmission is input in step S1 "Input: Affected link x, Time slot i". Let $t_{i,x} \rightarrow r_{i,x}$ be the interrupted transmitter-receiver pair in which is scheduled to transmit in time slot i. The neck node for the interrupted pair is then identified in step S2 "Identify neck-node $N_x$". The neck node is denoted as $N_x$, which is the node through which the pair is connected to the concentrator. $S_{i,N_x}$ is the set of transmitter-receiver pairs concurrently communicating in time slot i that are connected to the concentrator via neck node $N_x$, that is $S_{i,N_x} = \{t_{i,x} \rightarrow r_{i,x}\}$.

The algorithm limits the transmissions that are scheduled in the same time slot with the transmission on the affected link (if any) and that are in the same sector in step S3 "set only affected link to this time slot". That is, all the transmissions between pairs $t_{i,x} \rightarrow r_{i,x}$ which are connected to the concentrator by the same neck node $N_x$ as the affected link are rescheduled in this step. In other words, any nodes transmitting in the same time slot as the affected node, and in the same sector, are rescheduled such that the interrupted link is the only link set for that time slot.

In step S4 "Any concurrent users?", it is identified whether there are any nodes that are scheduled to transmit in the time slot i, and are in the sector identified. Initially, the sector identified is that of the interrupted transmission. However, if the SINR is not improved by the rescheduling of the links in this sector, the algorithm iterates through the adjacent sectors (step S7). Therefore step S4 checks for concurrent users in the sector identified.

If there are no concurrent transmissions in the sector, S4 returns a "no", and the algorithm goes to step S5, "$SINR_{r_{i,x}} \geq$ threshold". In this step, the SINR of the affected link is checked. That is, the SINR at the receiver $r_{i,x}$ for the transmission from the transmitter $t_{i,x}$ is calculated. If the SINR is greater than or equal to the threshold, S5 returns a "yes" and the algorithm goes to step S6 "stop".

If the SINR is not greater than or equal to the communication threshold, then S5 returns a "no" and the algorithm goes to step S7 "select adjacent neck node". In this step, the adjacent sector(s) is selected to be checked for concurrent users.

In the network shown in FIG. 3a for example (where neck node N1 is the affected sector) there are two adjacent neck nodes, N2 and N7. In the first iteration of step S7, neck node N2 is identified, and the corresponding sector checked for concurrent transmissions in step S4.

After the sectors are checked for concurrent transmissions in S4, the SINR of the affected link is checked, with the contribution from any concurrent transmissions that have thus far been found removed. For the network in FIG. 3a, if the SINR is not greater than or equal to the communication threshold after removing the contribution from the concurrently transmitting nodes in sector N2, then step S7 is performed again. This time the sector identified is that associated with N7.

The concurrent transmissions $S_i$ are restricted in an iterative manner in the adjacent sectors, thereby minimizing aggregated interference. Link performance of the affected link is checked at each stage. The algorithm selects adjacent sectors, working outwards from the affected node in step S7. Each sector is checked in S4 for any transmissions that are in the same time slot as the interrupted transmission. The SINR is checked in S5. When the SINR is greater than or equal to the communication threshold S5 returns a "yes" and the algorithm goes to step S6, "stop". Once all the sectors have been checked, all of the nodes in the network that are scheduled to transmit concurrently with the interrupted link will have been rescheduled. If the SINR is still not above the communication threshold at this stage, then it should be assumed that the interruption is not due to the other nodes in the network.

If a node in the selected sector is found to be scheduled to transmit concurrently with the interrupted transmission the step S4 returns a "yes", and the rescheduling subroutine is initiated. In step S8 "Input: Rescheduling link Y, Time slot TS=1 to L\{i}", the information regarding the link to be rescheduled and the available time slots is input to the rescheduling sub routine. The available time slots are time slots 1 to L, excepting time slot i, the time slot of the interrupted transmission. The available time slots for rescheduling are all the current time slots in the schedule, excepting the time slot i (which is the time slot of the interrupted transmission, and therefore also the time slot of link Y in the previous schedule). In step S10 "selected TS=arg max$_{TS}$ (SINR (Y$_{TS}$)≥threshold)", the activating criteria are used to determine if a link should be activated in a given time slot. In this step, the links or links that are set for rescheduling are iteratively checked through all available time slots to check if the SINR of the link exceeds the set threshold. In other words, at step S10, for each transmission to be rescheduled, the arg max$_{TS}$ (SINR (Y$_{TS}$)≥threshold) is calculated. This returns the set of time slots for which the SINR is the maximum value, with the criteria that the SINR is greater than or equal to the communication threshold for the returned time slots. This enables the communication to be rescheduled to the optimum time slot for which the SINR for the transmission is largest. If a time slot cannot be found for which SINR is greater than or equal to the communication threshold, a zero value is returned from S10. If time slots are found for which SINR is greater than or equal to the threshold communication, then the number of the time slot for which SINR is largest is returned.

In step S11 "if selected TS>0", if the number of a selected time slot is returned from step S10 then S11 returns a "yes" and the subroutine will go to step S13 "allocate Y in selected TS". In this step, the transmission to be rescheduled (link Y) is allocated in the new time slot. The time slot number returned from step 10 represents a time slot for which SINR is largest, and for which SINR is greater than or equal to the communication threshold.

If no such time slot exists, then a zero is returned from S10. This means that a link that is set for rescheduling could not be accommodated in the remaining time slots, and so a "no" is returned from S11. The scheduler increases the schedule length to schedule the link in a newly formed time slot in step S12. The schedule length L will therefore be increased by an increment 1. In step S10, the selected time slot number returned will be zero when no existing time slots give a SINR greater than or equal to the communication threshold. S11 of the subroutine therefore returns "no" and the subroutine goes to step S12 "Allocate Y in new TS L=L+1". S12 then creates a new time slot, the time slot number for which will be L+1. The transmission is scheduled in this new time slot.

The rescheduling subroutine is activated every time a link is found in step S4. The link is rescheduled, and then after step S13 or S12, the algorithm returns to step S4. At step S4, if all the links in the sector have been rescheduled, S4 will return a "no", and the SINR will be checked. If the rescheduling has caused the SINR to be increased such that it is now above the threshold, then step S5 will return a "yes" and the algorithm will be stopped. At this point, all the links required will have been rescheduled. The rescheduling information will then be broadcast in the following time period. The rescheduling information may consist of a new schedule, updated with the new time slots for the rescheduled transmission.

Step S11 can involve a further step of testing the effect of rescheduling the link to the new time slot. Once a time slot has been selected, the SINR for the other transmissions scheduled in that time slot can be checked, taking into account the contribution from the rescheduled link. A criteria for rescheduling the link to the selected time slot can also be that the SINR values of the other links scheduled in the time slot remain greater than the communication threshold value. This will add extra computational steps, however it will ensure that the rescheduling does not cause the interruption of a second link.

The rescheduling sub routine can be activated at a different stage in the algorithm and the information indicating the links to be rescheduled stored. The main algorithm may identify links to be rescheduled and then remove their contribution from the SINR calculated at step S5, in order to identify a final set of nodes to be rescheduled which will cause the SINR to be increased to a value greater than or equal to that of the threshold. Once the final set of links to be rescheduled is found, the rescheduling subroutine can be initiated, with each link input into the subroutine one at a time, until each link is rescheduled. Once the new activating criteria for the links are calculated, and each of the links to be rescheduled has a new time slot allocated, the rescheduling information is broadcasted by the concentrator to the nodes in the following period as shown in FIG. 2.

The rescheduling algorithm can be formulated in pseudo language where TS=time slot and L=schedule length (i.e. total number to time slots), as follows:

```
Input: Set of affected nodes identified by neck node
Output: New schedule
Step 1: Identify neck_node of interrupted link, let it be N_x
Step 2: Limiting concurrent transmissions at N_x for time slot i
  S_{i,N_x} = { t_{i,x} → r_{i,x} }
  for all S_{i,N_x} \{ t_{i,x} → r_{i,x}} do
  reschedule: set new activating criteria
  end for
Step 3: Check performance
  if (SINR_{r_{i,x}} ≥ γ_c)
  then
  terminate (step 5).
  else
Step 4: Iteratively setting concurrent transmission in neighbouring sectors to 0
  for α ← 1...N_R do
  S_{i,N_{x±a}} = {0}
  for all S_{i,N_{x±a}} do
  reschedule: set new activating criteria
  end for
  if (SINR_{r_{i,x}} ≥ γ_c)
  then
  terminate (step 5).
  end if
  end for
Step 5: end
Subroutine: reschedule: set new activating criteria
  for TS ← 1...L do
  TS_{selected} = arg max_{TS}(SINR_{TS,rk} ≥ γ_c)
  if ( TS_{selected} > 0)
  activate_at_slot TS_{Selected}
  else
  activate_at NEW_TS
  end if
  end for
```

Where indices at suffix take (x±a) mod R, where N$_R$ are the neck-nodes in the network, R is the total number of neck nodes in the network and N$_{x±a}$ refers to the adjacent neck-nodes. The sectors are therefore selected iteratively on either side of the sector of interrupted transmission. The maximum number of iterations is R, the total number of neck nodes, in other words the maximum number of sectors in the network that can be identified. If R is equal to 7, there are therefore 7 neck nodes and 7 sectors in the network. If node 3 is the sector of interrupted transmission, the adjacent sectors are sector 2 and 4. One of these sectors is identified first, then the other. The iteration continues through all 7 sectors, in other words the indices can take all values of (x±α) from 0 to R, in this case from 0 to 7.

In step 1, the sector of the interrupted transmission is identified. In this step, the neck node of the sector, $N_x$, is identified. In step 2, all the concurrent transmissions for the sector of the interrupted transmission $N_x$ are rescheduled, excepting the interrupted transmission itself, using the rescheduling algorithm. In this case, all the concurrent transmissions are rescheduled, and then step 3, check performance occurs. However, as has been discussed above, where multiple transmissions in the sector are scheduled to transmit in the same time slot as the interrupted transmission, they can be rescheduled according to rank, and the performance checked after each transmission is rescheduled. If the performance is greater than or equal to the threshold, then there is no need to reschedule the other concurrent transmissions in the same sector. This is therefore more efficient. If the performance is not greater than or equal to the threshold then the node with the next closest rank to the interrupted receiver node is rescheduled, and the performance checked again.

In step 3, the SINR is compared with the communication threshold value. If it is greater than or equal to the communication threshold then the algorithm goes to step 5—end. If it is not greater than or equal to the communication threshold value then the algorithm goes to step 4.

In step 4, the algorithm iterates through the adjacent sectors, rescheduling all the concurrent transmissions in these sectors. So for the first iteration, a=1, and the relevant sectors are therefore those with neck nodes $N_{x+1}$ and $N_{x-1}$. The neck-node_ID of the interrupted sector is x. The adjacent sectors are therefore identified as those with neck-node_ID of x±a, where a increases in increments of 1 until all the neck nodes in the network have been checked. The sector designated x+a is identified first, and checked, and then the sector designated x−a is identified in the next iteration. The value of a increases until all the nodes in the network $N_R$ have been identified. The number of transmitter receiver pairs in the sector checked for which there is a transmission scheduled in time slot i (the time slot of the interrupted transmission) is $S_{i,N_{x+1}}$. In step 4 the transmitter receiver pairs in the sector for which there is a transmission scheduled to be concurrent with the scheduled interrupted transmission are removed from the time slot i in the schedule, and therefore $S_{i,N_{x+1}}$ will be set to zero. Each of the removed transmissions is rescheduled in the rescheduling subroutine.

The final stage of step 4 is when the SINR is checked for the interrupted transmission. If SINR is greater than or equal to the communication threshold, then the algorithm goes to step 5—end. If it is not greater than or equal to, then the for loop iterates again, where a is increased by an increment of 1. The for loop continues until all the neck nodes in the network, i.e. $N_R$ neck nodes, and therefore sectors in the network have been checked. At this point, the algorithm ends as there are no further concurrently transmitting nodes in the network to be rescheduled.

The rescheduling subroutine iterates through all the available time slots, TS, where the available time slots are numbered 1 to L. L is the total number of time slots in the current schedule. For a link $t_{i,k}, r_{i,k}$ that has been identified to be rescheduled, the rescheduling sub routine calculates the time slots for which the SINR for the transmission from $t_{i,k}$ to $r_{i,k}$ is maximum. A time slot is only selected if the SINR is greater than or equal to the communication threshold. $TS_{selected}$ is therefore the number (between 1 and L) for the time slot for which SINR is maximum, with the condition that if the maximum SINR is less than the communication threshold then $TS_{selected}$ will be equal to zero.

If $TS_{selected}$ is greater than zero, then the transmission is activated in the schedule in the time slot numbered $TS_{selected}$. If it is not, then a new time slot is created in the schedule and the transmission is scheduled in this new time slot.

Figures 6, 7:
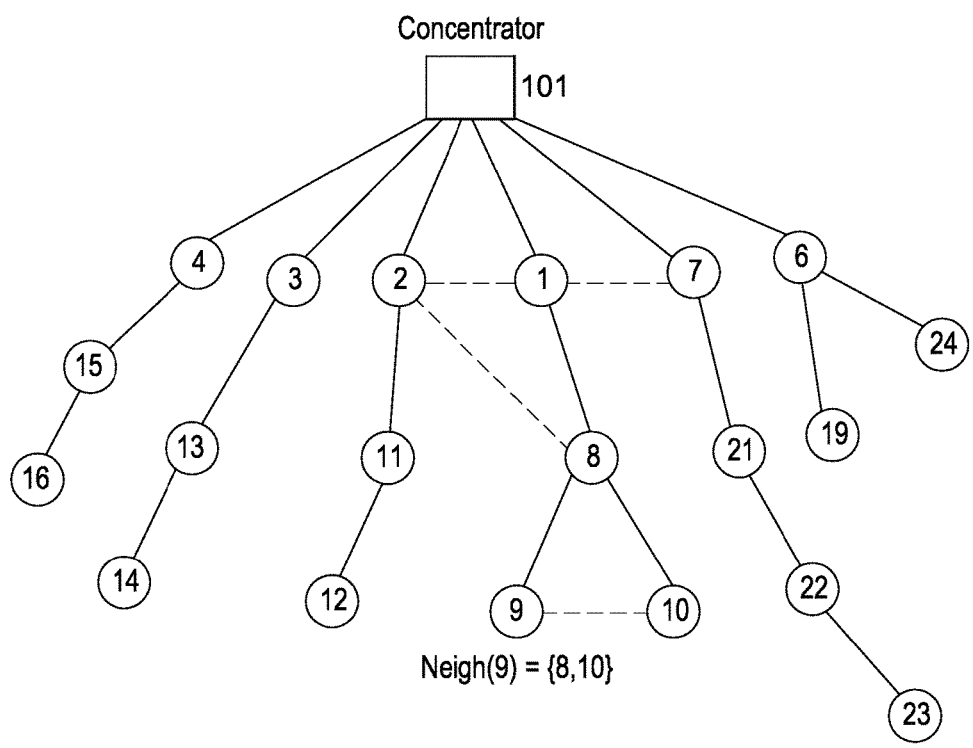
FIG. 6 shows a mesh network and illustrates neighbouring nodes and next-hop/route selection.
FIG. 7 shows a time slot schedule and concurrent transmissions.

FIG. 6 and FIG. 7 show a simple scenario for a small network. FIG. 6 shows the current status of links (in the tree form) of a mesh network and FIG. 7 its corresponding time slot schedule. FIG. 6 shows a concentrator 101. The concentrator is directly connected to six neck nodes, 1, 2, 3, 4, 6 and 7. The connections show the established lines of communication in the network. A further group of nodes are connected to the concentrator through the neck nodes. Node 15 is connected to neck node 4. Node 16 is connected to node 15. Nodes 15 and 16 are therefore in the sector identified by neck node 4. Node 13 is connected to node 3, and node 14 connected to node 13. Nodes 14 and 13 are in the sector identified by neck node 3. Node 11 is connected to node 2, and node 12 to node 11, so nodes 11 and 12 are connected to the concentrator through node 2. Node 8 is connected to node 1. Nodes 9 and 10 are connected to node 8. Nodes 8, 9 and 10 are therefore in the sector identified by neck node 1. Node 23 is connected to node 22 which is connected to node 21, which is connected to node 7, therefore these nodes are in the sector identified by neck node 7. Nodes 19 and 24 are connected to neck node 6.

FIG. 7 shows a table of the transmissions which are in each time slot. The concentrator is designated 0. The transmission from node 2 to the concentrator and the transmission from node 22 to node 21 are scheduled in time slot i. The transmission from node 1 to the concentrator and node 14 to node 13 are scheduled in time slot i+1. The transmissions from node 13 to node 3, node 9 to node 8 and node 23 to node 22 are in time slot i+2. The transmissions from node 3 to the concentrator and node 12 to node 11 are in time slot i+3. The transmission from not 8 to node 1 and node 16 to node 15 are in time slot i+4. The transmissions from node 7 to the concentrator, node 19 to node 6 and node 15 to node 4 are in time slot i+5.

The link 9→8 is scheduled in time slot i+2. If the link 9→8 is detected as interrupted, the first step in the rescheduling algorithm is to identify the corresponding neck-node 1. The algorithm then checks if there are any other links in sector $N_1$ scheduled in the same time slot. The other links in sector 1 are the transmission from 1 to the concentrator, transmission from node 8 to node 1 and transmission from node 10 to node 8. As none of these transmissions is scheduled in time slot i+2, it checks the adjacent neck-node $N_7$ and identifies that the link 23→22 is scheduled in the same time slot. The link 23→22 is rescheduled to another time slot that satisfies its performance criteria. In other words, another time slot is found for which if the transmission from node 23 to node 22 is scheduled in the time slot, the SINR for the transmission 23 to 22 is greater than or equal to the communication threshold.

At this stage the SINR of the interrupted link 9 to 8 is checked. If it is greater than or equal to the communication threshold, then the new schedule is implemented. If not, the process may be repeated iteratively through the adjacent sectors. The next step therefore would be to check if there were any transmissions in time slot i+2 for the sector identified with neck node 2. The process is repeated through the adjacent neck-nodes iteratively. In the given example, $N_3$ and then $N_6$ would be the next adjacent neck nodes. The link 13→3 in $N_3$ would be rescheduled to a different time slot that satisfies its performance criteria. The performance of the interrupted link is checked again until the aggregate interference is minimal, in other words there are no further links transmitting in the same time slot, or the link is revived, in other words the SINR is greater than or equal to the communication threshold.

An extra step can be added during link performance comparison stage prior to checking the next sector. In a mesh network, a node may have many neighbouring nodes within the transmission range. If a transmission link is interrupted, and there is another node within the transmission range, the transmission may be re-routed to the other node. The comparison ($SINR_{r_{i,x}} \geq \gamma_c$) can be evaluated for all the possible links from node 9, and not only for the earlier existing link. As above, determining the SINRs may involve calculating the SINR values. Alternatively, the SINRs may be the actual received powers at the receiver of the link. In this example, if performance of the link 9→8 is not greater than or equal to the communication threshold after the first rescheduling, all the available links for node 9 can be checked to see if there is an alternative route for the transmission. The other available links are indicated by dashed lines in the figure. As the node 9 has neighbouring nodes 8 and 10, the performance is checked for the link 9→10 as well. The neighbour list Neigh(9)={8,10} is collected and the links 98 and 910 are compared. The neighbour list for node 8 is 2 and 1, therefore Neigh(8)={1,2}. The network is currently using route 8 to 1, the route 8 to 2 is shown in a dashed line in the figure.

For example, the performance of link 9 to 10 in the time slot of the interrupted transmission can be checked. If the SINR is greater than or equal to the communication threshold, then the transmission of data from node 9 may be configured such that node 10 is the destination instead of node 8. Alternatively, all the time slots in the schedule may be checked. If a time slot is found for the link for which SINR is greater than or equal to the communication threshold, then the transmission of data from node 9 may be configured such that node 10 is the destination instead of node 8. Node 10 is then configured to transmit the data originating from node 9 to node 8. The scheduling of the alternative route can be performed in a similar manner to the rescheduling of the concurrent time slots in the rescheduling subroutine. In other words the time slot with the largest SINR (where the SINR must be above the communication threshold) is found in which to schedule the link 9 to 10. If there is more than one route, and for each route the performance of the links are satisfied, the earlier route may be selected. Alternatively, the route with the least hop count may be selected, or the route with the better link quality.

The above extra step of checking for possible re-routing options for the interrupted link can be inserted at any stage in the rescheduling algorithm. For example, the network can be checked for alternative routes, and the rescheduling of other transmissions only commenced if an alternative route cannot be found. Alternatively, it can be performed only after a certain number of sectors has been checked. In the example above, it is performed after the step of rescheduling the nodes in the sector of interrupted transmission.

Figure 8A:
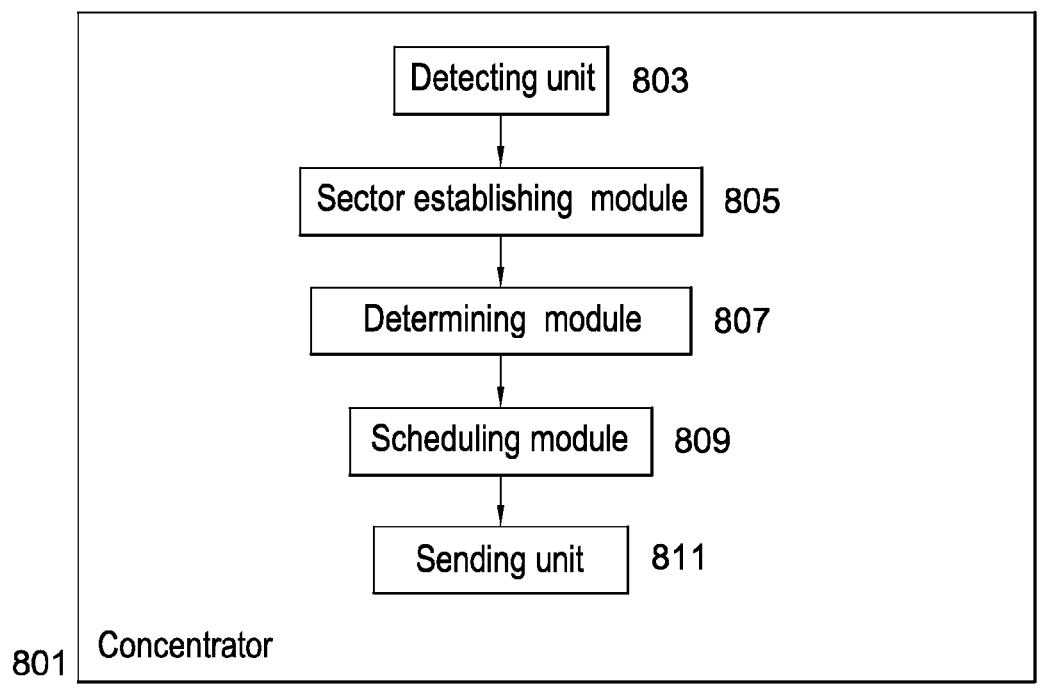
FIG. 8a shows a concentrator according to an embodiment.

FIG. 8a shows a representation of a concentrator 801 according to an embodiment. The concentrator 801 sends signals to and receives signals from neck nodes in a mesh network. A mesh network may be a smart meter network such as in FIG. 1a. The concentrator in such a network may be located at a supply company premises. Each of the neck nodes and further nodes in the network is a smart meter that is located in a house.

The concentrator comprises a detecting unit 803. The detecting unit 803 detects for interruption of transmission between a first node and a second node scheduled in a first time slot. Detecting for interruption of a transmission involves detecting for the case where data from the first node has not been received in four successive time periods.

The sector establishing module 805, establishes the sector of an interrupted transmission by identifying the neck node through which either the transmitter node or the receiver node is scheduled to communicate with the concentrator. The sector is identified from stored information about the topology of the network.

The information identifying the sector of the interrupted transmission, and the time slot of the interrupted transmission are output to a determining module 807, which identifies a sector to be checked and determines whether any nodes in the identified sector are scheduled to transmit during the time slot. As has been discussed above, the first sector identified to be checked is the sector of interrupted transmission. Each sector is then successively identified to be checked according to its proximity to the sector of the interrupted transmission, until a node scheduled to transmit during the first time slot is found. Proximity is determined from stored network topology information designating the adjacent sectors, where the next sector may be identified to be checked as any sector that has not been checked, and that is adjacent to a sector that has been checked.

Once a node has been found for which a transmission is scheduled in the first time slot, information concerning the node is output from the determining module 807 to a scheduling module 809. The scheduling module 809 determines a different time slot for the transmission from the node found by calculating the SINR of the transmission for each time slot of the schedule, determining the set of time slots for which the SINR is greater than the communication threshold value, and selecting the time slot with the largest SINR. If no time slots in the schedule return an SINR greater than or equal to the communication threshold value then it adds a new time slot to the schedule.

The scheduling module 809 outputs the schedule information to a sending unit 811, which then sends a signal instructing rescheduling of the transmission to the different time slot. This signal consists of a broadcast of the entire new schedule to all the nodes in the network at the beginning of the next time period. It may consist of a control signal sent only to the affected node.

Detecting for interruption of a transmission can mean detecting for interruption of a transmission where there is a likelihood that rescheduling may recover the interrupted link. This means that the concentrator may also detect for the case where no power outage alert has been received. If the detecting unit detects an interruption of a transmission, it outputs to a sector establishing module 805.

Rather than checking the existing time slots, the scheduling module 809 can calculate a different time slot by simply adding a new time slot to the schedule.

This signal sent from the sending unit may consist of a control signal sent only to the affected node, rather than a schedule sent to every node in the network.

Figure 8B:
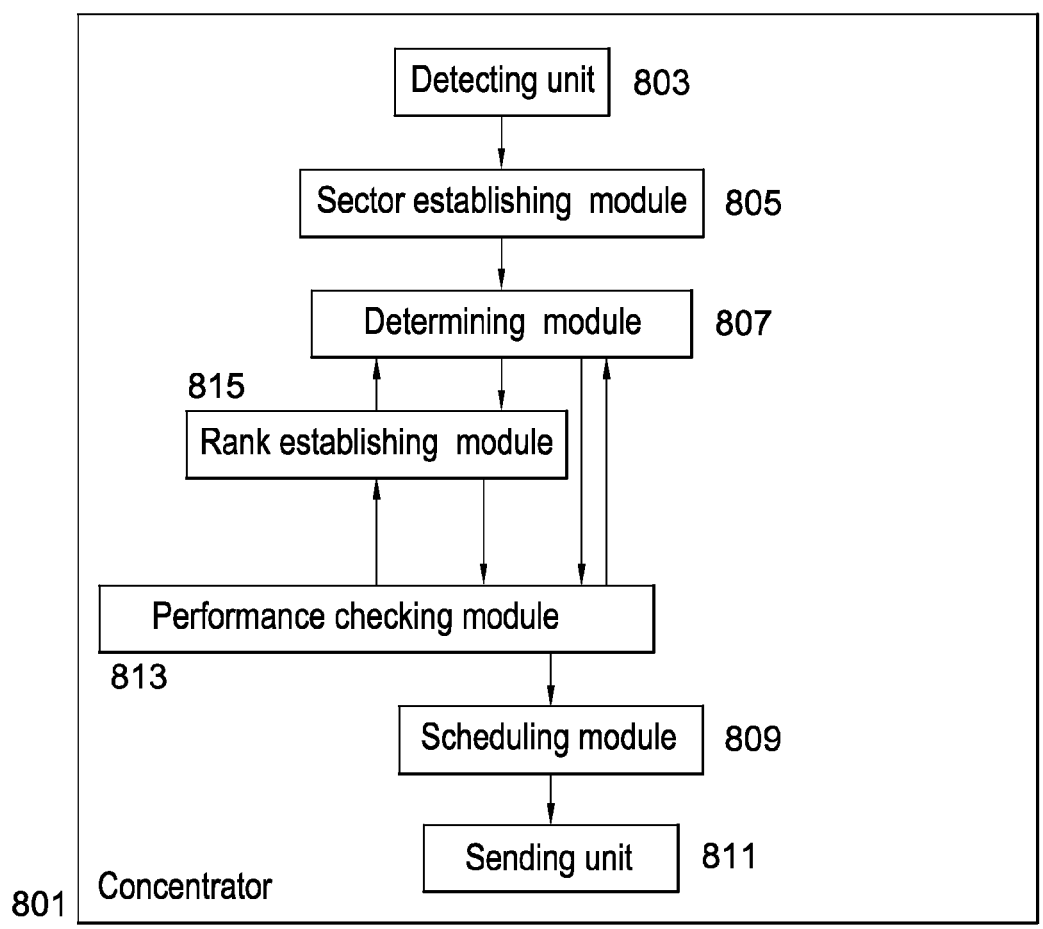
FIG. 8b shows a concentrator according to an embodiment.

FIG. 8b shows a representation of a concentrator according to an embodiment which comprises a performance checking module 813. The performance checking module calculates the SINR for the interrupted transmission where the contribution from any transmissions from nodes found by the determining module is not included in the calculation. The performance checking module 813 outputs information to the scheduling module 809 when the SINR is greater than or equal to the communication threshold value. The scheduling module then determines a different time slot for the node or nodes found.

The concentrator also comprises a rank establishing module 815. The determining module 807 may be configured to output information to the rank establishing module 815 if a plurality of nodes scheduled to transmit during in the first time slot are found in the sector identified to be checked. If more than one node in an identified sector is scheduled to transmit in the same time slot as the interrupted link, then the rank establishing module 815 determines the node that has a rank closest to the rank of the affected receiving node so that it can be rescheduled first. If only 1 node is found to be scheduled to transmit in the time slot, then the determining module 807 does not output to the rank establishing module 815. If no nodes are found to transmit in the time slot then a new sector is identified. However, if more than 1 node is found to transmit in the time slot, then the determining module outputs this information to the rank establishing module 815 and the rank establishing module enables the node chosen to be rescheduled first to be chosen based on its rank (a value indicating the number of nodes through which said found node communicates with the concentrator). In the case where two nodes with rank equally close to that of the receiver of the interrupted link are found, then both nodes can be rescheduled, or one node can be chosen first.

The rank establishing module 815 is configured to establish the rank of each concurrently transmitting node in the sector identified, and determine the difference between the rank of each of the nodes and the rank of the nodes of the interrupted link.

The rank establishing module 815 then identifies the node for which the difference is the smallest value. This information is output to the performance checking module 813 which will then calculate the SINR for the interrupted transmission without the contribution from the node for which the difference is the smallest. If the SINR is not greater than or equal to the communication threshold value, the performance checking module 813 will output information indicating this to the rank establishing module 815. If there are further nodes that have been found in the sector identified, then the rank establishing module 815 identifies the node for which the difference is the next smallest value and outputs this information to the performance checking module 813. If there are not, then the rank establishing module 815 outputs this information to the determining module 807, which then identifies the next sector to be checked.

Figure 8C:
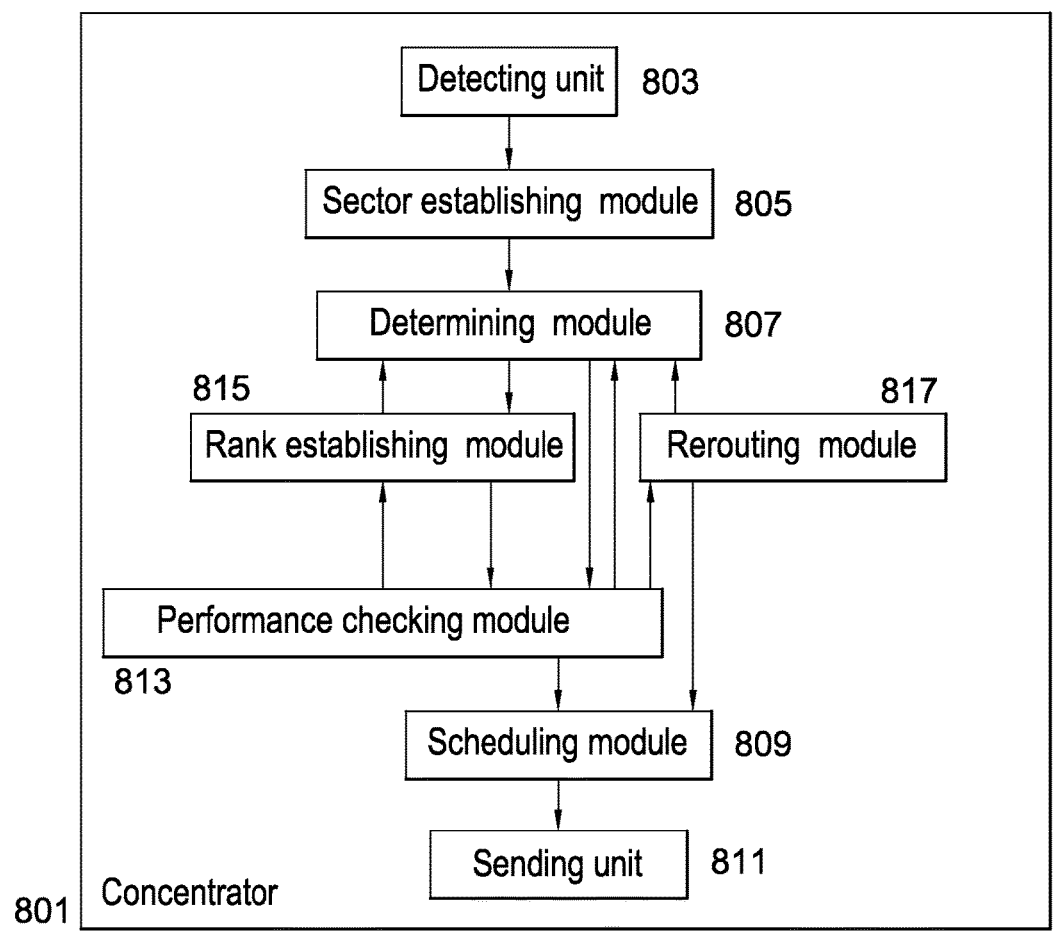
FIG. 8c shows a concentrator according to an embodiment.

FIG. 8c shows a representation of a concentrator according to an embodiment which comprises a re-routing module 817, configured to calculate the SINR for alternative routes for communication from said first node to said concentrator for each time slot. The comparison ($SINR_{r_{tx}} \geq \gamma_c$) is evaluated for all the possible links from the transmission node of the affected link. If performance of the interrupted link is not greater than or equal to the communication threshold after the first rescheduling, all the available links for the transmission node are checked to see if there is an alternative route for the transmission.

After the determining module 807 has determined the concurrently transmitting nodes from the first sector, it outputs this information to the performance checking module 813. The performance checking module 813 calculates the SINR of the interrupted link, without the contribution from the concurrently transmitting nodes from the first sector. If the SINR is not greater than or equal to the communication threshold value, then the performance checking module 813 outputs this information to the rerouting module 817. The re-routing module then checks the SINR for all the receivers in range of the transmitter of the interrupted link, for each time slot. If a link is found for which the SINR is greater than the communication threshold value, then the re-routing module outputs this information to the scheduling module 809. The new schedule, in which the transmitter node of the interrupted transmission is now scheduled to transmit to a different receiver node, is then sent to the sending unit 811, from which it is output to the nodes. If the re-routing module 817 does not find a link for which the SINR is greater than the communication threshold, the re-routing module 817 outputs this information to the determining module 807, and the next sector is identified to be checked. If there is more than one link found for which the SINR is greater than the communication threshold, the earlier route may be selected. Alternatively, the route with the least hop count may be selected, or the route with the better link quality.

The performance checking module 813 may be configured to output to the rerouting module 817 at a different stage. For example, the performance checking module 813 may be configured to output to the rerouting module 817 (instead of the determining module 807) after a certain number of sectors have been checked. Alternatively, it can be performed before rescheduling is attempted. For example, the network can be checked for alternative routes, and the rescheduling of other transmissions only commenced if an alternative route cannot be found.

Figure 9:
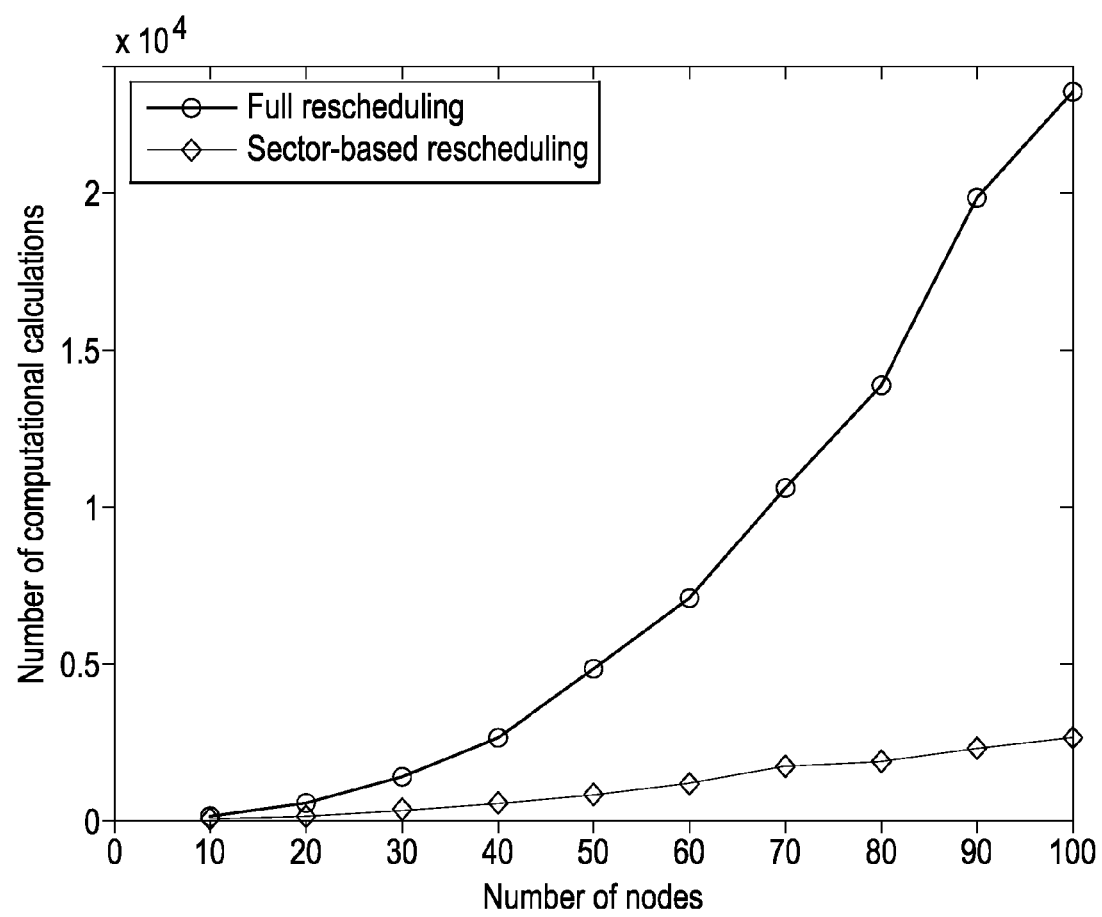
FIG. 9 shows a comparison of computational complexity of full rescheduling and sector-based rescheduling.

A performance analysis of the rescheduling algorithm is shown in FIG. 9, FIGS. 10 (a) and (b) and FIGS. 11 (a), (b), (c) and (d). The problem of finding an optimal conflict-free schedule for a STDMA mesh network is known to be NP-hard. The search space for the exhaustive search is $2^{L \cdot N}$ (where L is the number of time slots and N the number of nodes) which is prohibitively high, and so not considered for comparison. A number of approximation algorithms for timeslot allocation inspired by graph colouring techniques have been proposed with polynomial computational complexity. Graph colouring is a theoretical approach where nodes and links are drawn as graphs, with edges and vertices. Links which are scheduled in the same time slot are designated with the same colour, to show if a line overlaps with another. It does not use signal strength in estimating the link quality. The graphs in FIGS. 9, 10 and 11 compare the performance of the sector-based rescheduling algorithm with a full rescheduling based on an approximation algorithm, which reschedules the entire network.

FIG. 9 shows the computational complexity of the sector based rescheduling algorithm compared with full rescheduling. The x axis represents the number of nodes in the network. The y axis shows the number of computational calculations for rescheduling after it is detected that a link in the network is interrupted. The number of computational calculations for full rescheduling is shown by the circular points, and rises steeply with the number of nodes. For example, for a network with 90 nodes the number of computational calculations to fully reschedule is of the order of $2 \times 10^4$. The number of computational calculations for the sector based rescheduling is shown by the diamond points, and is consistently less than the number for the full rescheduling. For example, for a network of 90 nodes, the number of computational calculations is of the order of $0.25 \times 10^4$.

The number of computational calculations for both the full rescheduling and the sector based rescheduling includes interference calculation of each links, and with each other and evaluating the appropriate time slots for transmission. The total number of steps also includes the admission control steps i.e. checking the SINR for the existing links in each time slot for which it is considered to reschedule a link to check if the addition of the new link affects their SINR.

Figure 10A:
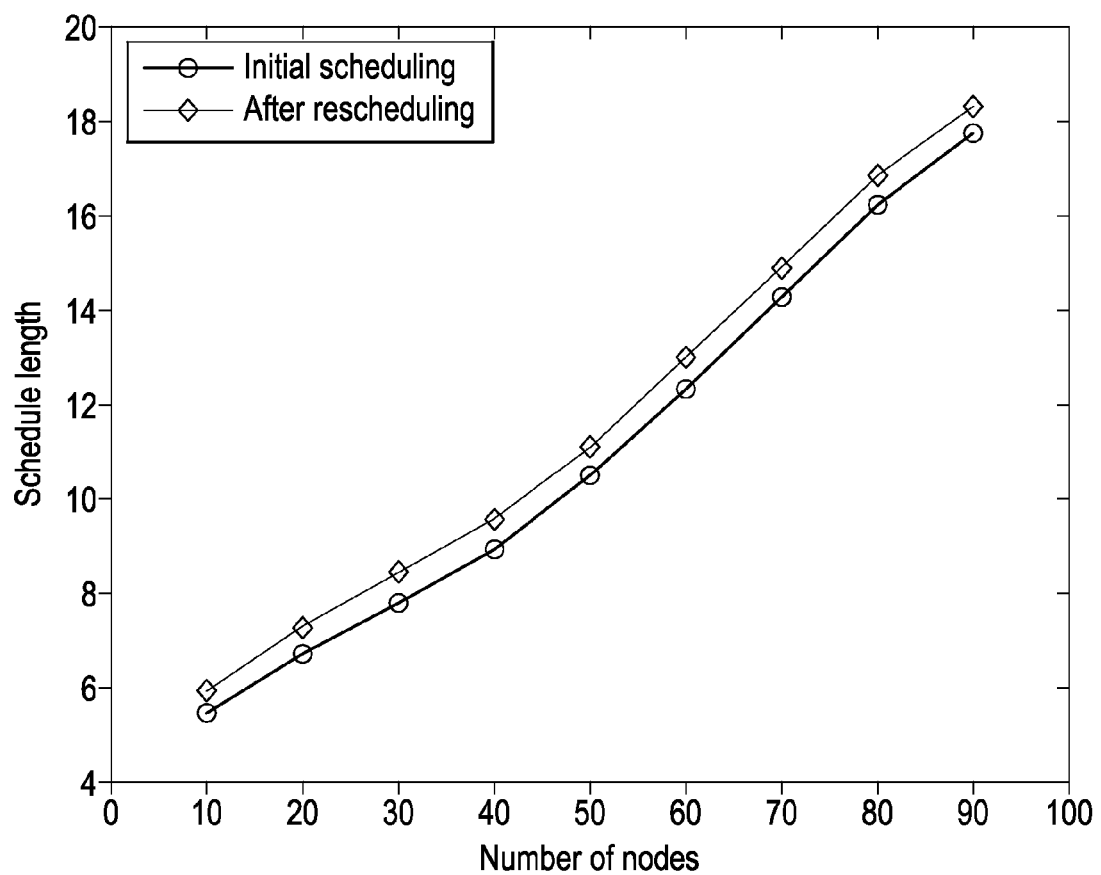
FIG. 10a shows a comparison of schedule length after rescheduling.

The total number of time slots allocated (i.e. the schedule length) before and after the rescheduling is shown in FIG. 10(a). The x axis again shows the number of nodes in the network. The y axis shows the schedule length. The data shown is that averaged over several trials. The circular points show the schedule length initially. The diamond points show the schedule length after rescheduling. The schedule length after rescheduling is consistently slightly higher. However, the increase is less than one time slot meaning that, averaged over several trials, the increase in schedule length is less than one, and therefore mostly the links are able to be rescheduled in an existing time slot. The increase in schedule length is attributed to the fact that sometimes rescheduling a link requires creating an additional time slot.

Figure 10B:
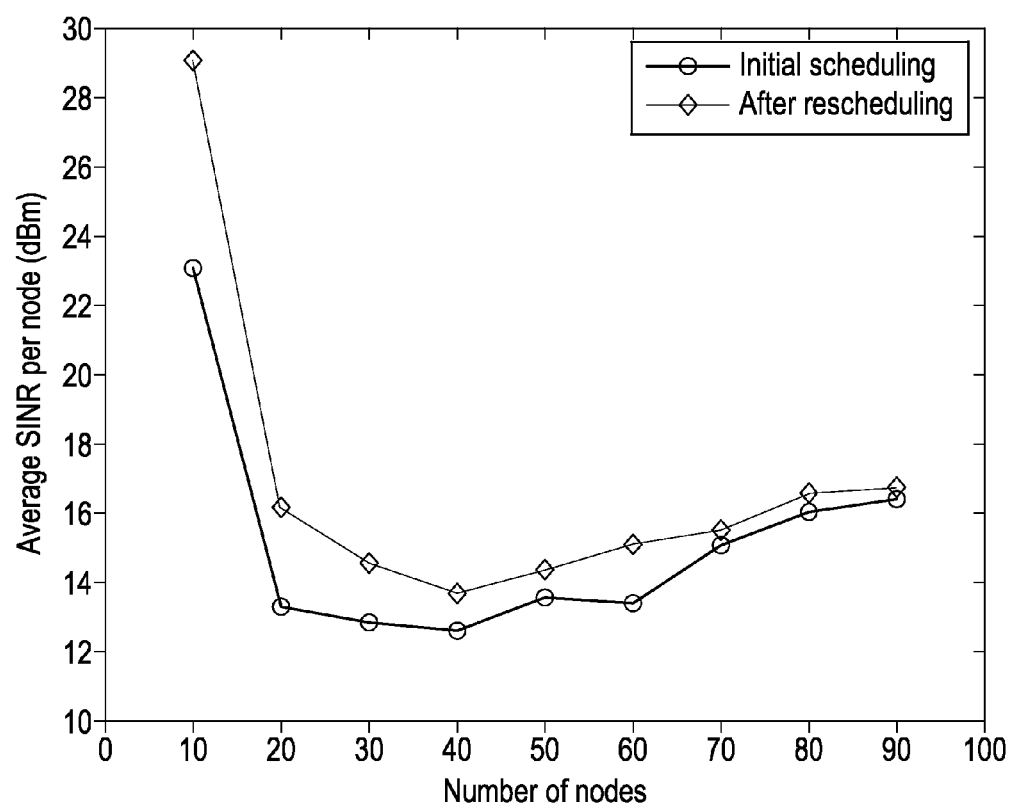
FIG. 10b shows improvement in average SINR per node after rescheduling.

FIG. 10(b) shows the average SINR for the network on the y axis, and the number of nodes in the network on the x axis. The circular points show the average SINR for the network with the initial schedule. The diamond points show the average SINR for the network after the rescheduling. The average SINR per node for the network is the sum of the SINR values calculated for each transmission in the scheduling period, divided by the number of transmissions. The link rescheduling improves the average SINR of nodes in the network. The improvement of the SINR specifically comes from the links in the affected time slot being rescheduled. As the number of nodes increases, the leverage for SINR improvement is higher with the increasing number time slots. That is, as the number of nodes increases, the number of concurrent transmissions in the same time slot also increases. So for a large network, there will be several concurrent transmissions, and any of them will be operating at close to threshold level. The rescheduling offers these links extra leverage to gain SINR.

FIGS. 11 a, b, c and d show the performance characteristics of the algorithm for link quality improvement (LQI) levels 5, 10, 20 dBm. The LQI levels are the interference barrier levels that the rescheduling algorithm must overcome, in other words the level of interference affecting the link. For all figures, the data for LQI level of 5 dBm is shown with circles, for 10 dBm with diamonds and for 20 dBm with crosses. The data is averaged over several trials.

Figure 11A:
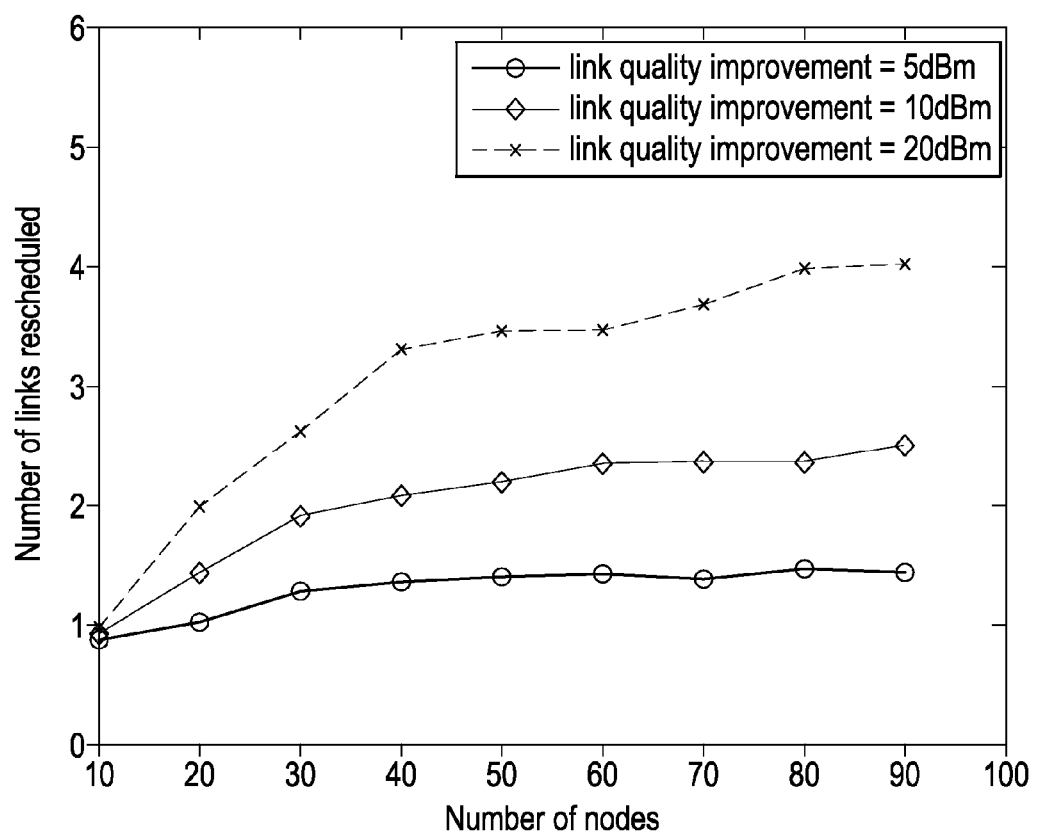
FIGS. 11a to 11d show performance characteristics of the rescheduling algorithm for different interference recovery levels.

FIG. 11(a) shows the number of links rescheduled to achieve the LQI recovery levels. The y axis shows the number of links required to be rescheduled, the x axis shows the number of nodes in the network. For a network with 20 nodes, where the interference affecting the link (LQI level) is 5 dBm, the rescheduling algorithm overcomes this LQI level in by rescheduling 1 link on average. For an LQI level of 20 dBm, it reschedules 2 links on average. The greater the interference level to be overcome, the more links need to be rescheduled.

Figure 11B:
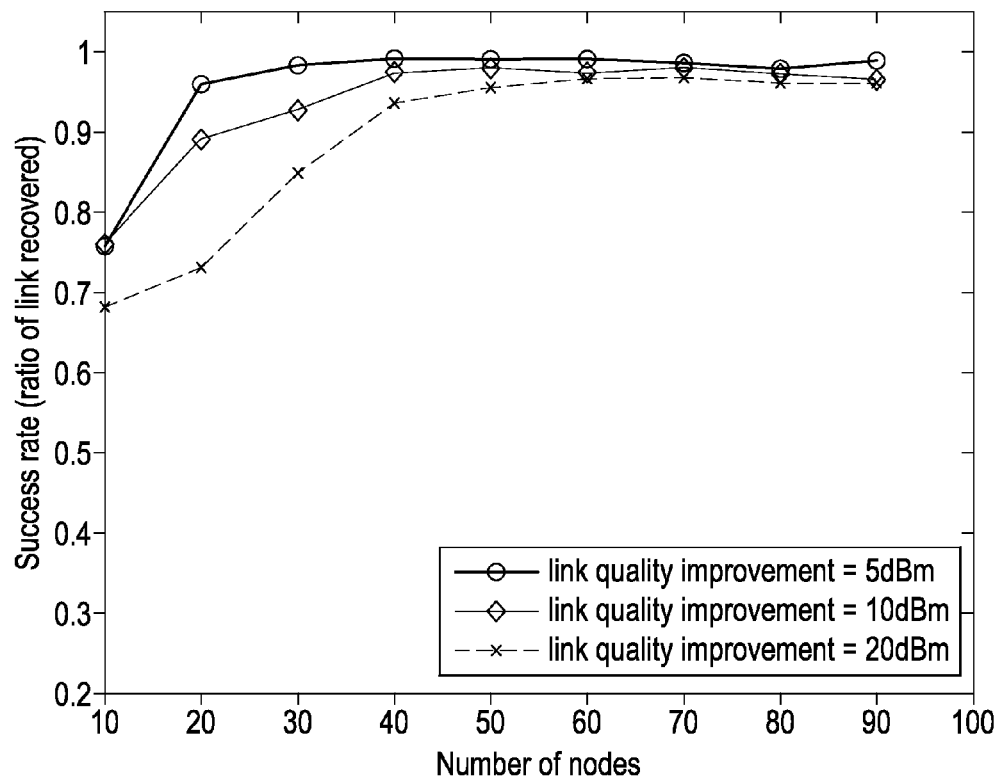

The success rate in recovery is shown in FIG. 11(b). The y axis shows the success rate, that is, the ratio of links recovered to interrupted links. The x axis shows the number of nodes in the network. For all LQI levels, the success rate is close to 1 for networks with over 50 nodes. The success rate is lower for a higher LQI level. The success rate is also lower for smaller networks.

Figure 11C:
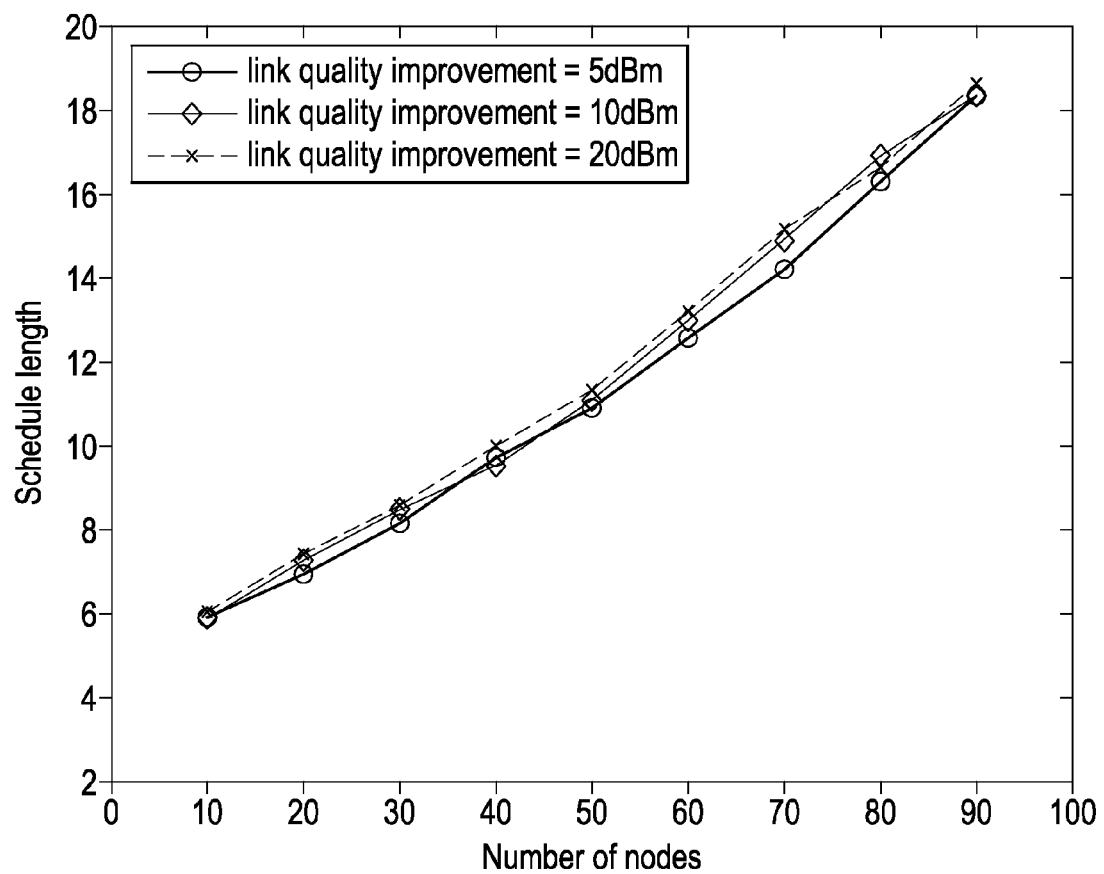

In FIG. 11(c), the y axis shows the schedule length after rescheduling, and the x axis shows the number of nodes in the network. There is not a great difference between the schedule length after rescheduling for the three different recovery levels.

Figure 11D:
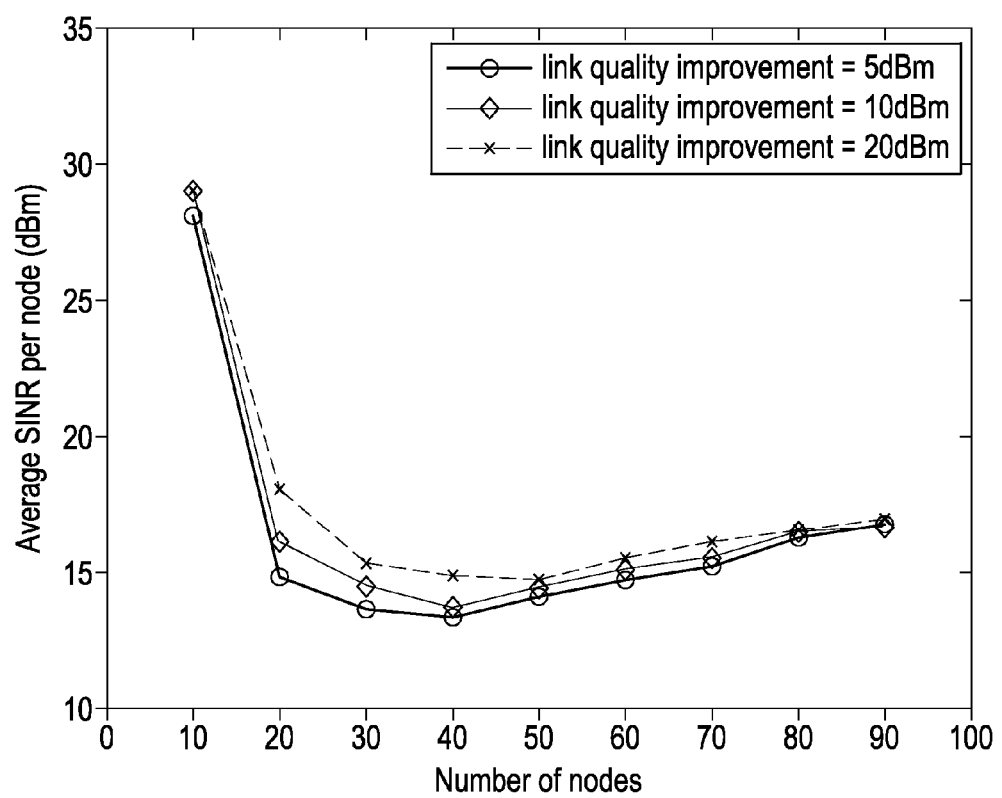

FIG. 11(d) shows the average SINR per node in the network after rescheduling on the y axis, and the number of nodes in the network on the x axis. There is an improvement in average SINR per node for the case of 10 dBm and 20 dBm primarily because of the number of links rescheduled.

The rescheduling algorithm is aimed at minimizing aggregated interference and thereby improving reliability. Reliability is measured in terms of number of disconnected, or interrupted, links saved. If necessary, the method will trade-off throughput (and longer schedule length) to achieve the required reliability of the link. The throughput is measured in bytes transmitted per second. The longer the schedule length, the lower the throughput. The method performs sector-based local rescheduling and may iteratively reschedule for the entire network, adjusting to the changes according to the interference environment. The primary objective of the method is to minimize aggregate interference in the precinct of an affected node and thereby improving the chances of link revival.

The rescheduling method proposed improves the robustness and reliability of the wireless mesh network where one or more smart meter node failure is detected. Instead of rescheduling the entire mesh network, the computational complexity of the rescheduling algorithm is reduced by rescheduling only selected concurrent transmissions. The possible interference scenarios and localisation information are considered in developing an adaptive sector-based STDMA algorithm that minimizes the number of steps in rescheduling links.

In addition to improving the reliability of links, the method also allows the concentrator to scale up depending on the interference environment and external network factors. The schedule adapts and scales to changes in interference environment, network size or external factors. It gives an estimate of the number of nodes that could potentially connect to the concentrator. The scheduling and channel reuse of a particular sector reflects the interference environment in that region. This means that rather than computing the schedule for the entire network at once, it can be done on a sector by sector basis. Scalability is a critical issue for larger networks. This method of local scheduling could therefore be used in a dense urban network of large number of users.

While certain embodiments have been described, these embodiments have been presented by way of example only, and are not intended to limit the scope of the inventions. Indeed, the novel methods and apparatus described herein may be embodied in a variety of other forms; furthermore, various omissions, substitutions and changes in the form of the methods and apparatus described herein may be made without departing from the spirit of the inventions. The accompanying claims and their equivalents are intended to cover such forms or modifications as would fall within the scope and spirit of the invention.

The invention claimed is:

1. A concentrator configured to send signals to and receive signals from a plurality of neck nodes in a TDMA mesh network, wherein each neck node defines a sector of the mesh network which may comprise a plurality of further nodes, the concentrator comprising:

a detecting unit, configured to detect for interruption of transmission between a first node and a second node scheduled in a first time slot;

a sector establishing module, configured to establish the sector of an interrupted transmission by identifying the neck node through which at least one of said first node and said second node is scheduled to communicate with the concentrator;

a determining module, configured to identify a sector to be checked and to determine whether any nodes in said sector are scheduled to transmit during said first time slot, wherein each sector is successively identified to be checked according to its proximity to the sector of the interrupted transmission, until at least one node scheduled to transmit during said first time slot is found;

a scheduling module, configured to determine a different time slot for the transmission from said at least one node found by the determining module;

a sending unit, configured to send a signal instructing rescheduling of said transmission to said different time slot.

2. The concentrator of claim 1, further comprising:
a performance checking module, configured to:
determine the SINR for the interrupted transmission without the contribution from transmissions from nodes found by the determining module;
check whether SINR is greater than or equal to a threshold value;
if SINR is not greater than or equal to a threshold value, output information to said determining module indicating that the next sector is to be identified to be checked.

3. The concentrator of claim 1, wherein said scheduling unit is configured to calculate a different time slot by adding a new time slot to the schedule.

4. The concentrator of claim 1, wherein said scheduling unit is configured to
calculate a different time slot by determining the SINR of the transmission from nodes found by the determining module, for each time slot of the schedule,
determine the set of time slots for which the SINR is greater than or equal to the threshold value; and
select the time slot from this set with the largest SINR.

5. The concentrator of claim 1, wherein said detecting unit is configured to register an interruption of a transmission if it is detected that data from said first node has not been received for four successive periods.

6. The concentrator of claim 5, wherein said detecting unit is configured to register an interruption of a transmission if it is also detected that no power outage alert message has been received for said first node or said second node.

7. The concentrator of claim 1, further comprising a rank establishing module, wherein said determining module is further configured to output information to said rank establishing module if a plurality of nodes scheduled to transmit during said first time slot are found in said sector identified to be checked;
where said rank establishing module is configured to:
establish the rank of each of the plurality of nodes scheduled to transmit during said first time slot found in said sector identified to be checked, where the rank is a value indicating the number of nodes through which a node communicates with the concentrator;
determine the differences between the rank of each of said nodes and the rank of said second node;
identify the node for which the difference is the smallest value.

8. The concentrator of claim 7, where said rank establishing module is further configured to:
output information to said performance checking module indicating the node for which the difference is the smallest value.

9. The concentrator of claim 1, wherein said determining module is configured to identify the first sector to be checked as the sector of the interrupted transmission.

10. The concentrator of claim 9, wherein said determining module is configured to identify the next sector to be checked by identifying a sector that has not been checked, and that is adjacent to a sector that has been checked.

11. The concentrator of claim 10, wherein said determining module is configured to identify a sector that is adjacent to a sector that has been checked using information stored at the concentrator indicating the neck-node_ID of each neck node.

12. The concentrator of claim 1, wherein the sector establishing module and the determining module use information indicating the topology of the mesh network to establish the sector of interrupted transmission and to identify a sector to be checked.

13. The concentrator of claim 1, further comprising a rerouting module, configured to determine the SINR for a transmission from said first node to each possible receiver node, for each time slot in the schedule.

14. The concentrator of claim 13, where said rerouting module is further configured to:
identify the set of nodes for which SINR is greater than or equal to a threshold value;
select the node from said set of nodes for which the number of hops to said concentrator is least.

15. The concentrator of claim 1, where said concentrator is a concentrator for a wireless smart meter mesh network.

16. A TDMA mesh network, comprising the concentrator of claim 1, further comprising a plurality of neck nodes, wherein each neck node is configured to communicate directly with said concentrator and defines a sector of the mesh network, which may comprise a plurality of further nodes.

17. A method of managing communication in a TDMA mesh network, wherein said mesh network comprises a concentrator and a plurality of neck nodes, wherein each neck node is configured to communicate directly with said concentrator and defines a sector of the mesh network which may comprise a plurality of further nodes, the method comprising:
detecting for interruption of transmission between a first node and a second node scheduled in a first time slot;
in the event that an interruption is detected:
establishing the sector of the interrupted transmission by identifying the neck node through which at least one of said first node and said second node is configured to communicate with said concentrator;
identifying a sector to be checked and determining whether any nodes in said sector are scheduled to transmit during said first time slot, wherein each sector is successively identified to be checked according to its proximity to the sector of the interrupted transmission, until at least one node scheduled to transmit during said first time slot is found;
rescheduling the transmission from said at least one node to a different time slot.

18. The method of claim 17, where a plurality of nodes scheduled to transmit during said first time slot are found in said sector identified to be checked, further comprising the step of:

establishing the rank of each of said plurality of nodes scheduled to transmit during said first time slot found in said sector identified to be checked, wherein the rank is a value indicating the number of nodes through which a node communicates with the concentrator;

determining the differences between the rank of each of said nodes and the rank of said second node;

identifying the node for which the difference is the smallest value.

19. The method of claim 18, further comprising the steps of:

determining the SINR for the interrupted transmission, without the contribution from nodes scheduled to transmit during said first time slot found in the sectors checked;

checking whether said SINR is greater than or equal to a threshold value;

if said SINR is greater than or equal to a threshold value, rescheduling the transmissions from said nodes to different time slots;

if SINR is not greater than or equal to a threshold value, identifying the node for which the rank difference is the next smallest value.

20. A non-transitory computer program product stored on a computer-readable media comprising instructions operative to cause a processor to execute a method according to claim 17.

* * * * *